(12) United States Patent
Song et al.

(10) Patent No.: US 11,136,480 B2
(45) Date of Patent: *Oct. 5, 2021

(54) THERMAL SPRAY PLASTIC COATING FOR EDGE SEALING AND FILLET SEALING

(71) Applicant: THE BOEING COMPANY, Chicago, IL (US)

(72) Inventors: Weidong Song, Woodinville, WA (US); Fei Cai, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/052,121

(22) Filed: Aug. 1, 2018

(65) Prior Publication Data

US 2020/0040240 A1 Feb. 6, 2020

(51) Int. Cl.
| | | |
|---|---|---|
| *C09K 3/10* | (2006.01) | |
| *B05B 15/00* | (2018.01) | |
| *B05D 1/02* | (2006.01) | |
| *C09D 5/03* | (2006.01) | |
| *C09D 5/24* | (2006.01) | |
| *C09D 171/00* | (2006.01) | |
| *C23C 4/04* | (2006.01) | |

(52) U.S. Cl.
CPC ............ *C09K 3/10* (2013.01); *B05B 15/00* (2013.01); *B05D 1/02* (2013.01); *C09D 5/03* (2013.01); *C09D 5/24* (2013.01); *C09D 171/00* (2013.01); *C23C 4/04* (2013.01)

(58) Field of Classification Search
CPC .............. C09K 3/10; B05B 1/02; B05B 15/00
See application file for complete search history.

(56) References Cited

U.S. PATENT DOCUMENTS

| | | | |
|---|---|---|---|
| 3,755,713 A | 8/1973 | Paszkowski | |
| 5,302,414 A * | 4/1994 | Alkhimov | ............... B05B 7/144 427/191 |
| 8,293,378 B2 * | 10/2012 | Owen | ........................ C23C 4/02 428/626 |
| 8,658,256 B2 | 2/2014 | Shokri et al. | |
| 2002/0168466 A1 | 11/2002 | Tapphorn et al. | |
| 2005/0048218 A1* | 3/2005 | Weidman | ................... C23C 4/04 427/446 |
| 2005/0196543 A1 | 9/2005 | Morton | |
| 2010/0224724 A1 | 9/2010 | Kamino et al. | |
| 2014/0055906 A1 | 2/2014 | Whitlock et al. | |
| 2014/0370203 A1* | 12/2014 | Sailer | ....................... C23C 24/04 427/455 |
| 2015/0210039 A1 | 7/2015 | Simmons et al. | |
| 2016/0096302 A1 | 4/2016 | Drexler et al. | |

(Continued)

FOREIGN PATENT DOCUMENTS

| | | |
|---|---|---|
| CN | 1410475 A | 4/2003 |
| CN | 103194142 A | 7/2013 |

(Continued)

*Primary Examiner* — Nathan T Leong
(74) *Attorney, Agent, or Firm* — Coats & Bennett, PLLC

(57) ABSTRACT

Tunable thermoplastic polymer sealants and tunable conductive thermoplastic polymer sealants, and edge seals and fillet seals produced from such sealants; and substrates, components and objects comprising the tunable edge seals and fillet seals, and methods for making and applying such edge seals and fillet seals are disclosed.

21 Claims, 17 Drawing Sheets

(56) References Cited

U.S. PATENT DOCUMENTS

2016/0107739 A1  4/2016  Restuccia et al.
2018/0298154 A1  10/2018 Lundorf et al.

FOREIGN PATENT DOCUMENTS

| CN | 107674559  | A  | 2/2018 |
|----|------------|----|--------|
| EP | 0988898    | A2 | 3/2000 |
| EP | 2733231    | A1 | 5/2014 |
| EP | 2585372    | B1 | 4/2016 |
| EP | 3150502    | A1 | 4/2017 |
| WO | 2008048705 | A2 | 4/2008 |
| WO | 2015023353 | A1 | 2/2015 |
| WO | 2016078664 | A1 | 5/2016 |
| WO | 2018110488 | A1 | 6/2018 |

* cited by examiner

120

102a — DIRECTING AMOUNT OF 1st AND 2nd THERMOPLASTIC POLYMER POWDER TO HIGH VELOCITY SPRAYER

103 — DIRECTING CONDUCTIVE POWDER TO HIGH VELOCITY SPRAYER CONCURRENTLY WITH THERMOPLASTIC POLYMER POWDER

104a — FORMING CONDUCTIVE THERMOPLASTIC POLYMER SPRAY FORMULATION

106a — DIRECTING CONDUCTIVE THERMOPLASTIC POLYMER SPRAY FORMULATION FROM SPRAYER TO SUBSTRATE SURFACE

108a — FORMING CONDUCTIVE THERMOPLASTIC COATING ON SUBSTRATE SURFACE

202 — DELIVERING AT LEAST ONE THERMOPLASTIC POLYMER POWDER FEEDSTOCK TO A HIGH-VELOCITY SPRAYER

204 — FORMING A THERMOPLASTIC POLYMER SEALANT MATERIAL

206 — DIRECTING THE THERMOPLASTIC POLYMER SEALANT MATERIAL FROM THE HIGH VELOCITY SPRAYER TO A SUBSTRATE SURFACE

208 — DEPOSITING AN AMOUNT OF THE THERMOPLASTIC POLYMER SEALANT ONTO THE SUBSTRATE SURFACE TO FORM A THERMOPLASTIC POLYMER SEAL

┌──────────────────────────────────────────────────────┐
402 ─│  DELIVERING AT LEAST ONE THERMOPLASTIC POLYMER       │
     │  POWDER FEEDSTOCK TO A HIGH-VELOCITY SPRAYER         │
     └──────────────────────────────────────────────────────┘
                              ↓
     ┌──────────────────────────────────────────────────────┐
404 ─│  DELIVERING A CONDUCTIVE POWDER FEEDSTOCK            │
     │  TO THE HIGH VELOCITY SPRAYER,                       │
     └──────────────────────────────────────────────────────┘
                              ↓
     ┌──────────────────────────────────────────────────────┐
406 ─│  FORMING A CONDUCTIVE THERMOPLASTIC POLYMER          │
     │  SEALANT MATERIAL                                    │
     └──────────────────────────────────────────────────────┘
                              ↓
     ┌──────────────────────────────────────────────────────┐
408 ─│  DIRECTING THE CONDUCTIVE THERMOPLASTIC POLYMER      │
     │  SEALANT MATERIAL FROM THE HIGH                      │
     │  VELOCITY SPRAYER TO A SUBSTRATE SURFACE             │
     └──────────────────────────────────────────────────────┘
                              ↓
     ┌──────────────────────────────────────────────────────┐
410 ─│  DEPOSITING AN AMOUNT OF THE CONDUCTIVE THERMOPLASTIC│
     │  POLYMER SEALANT ONTO THE SUBSTRATE SURFACE TO FORM  │
     │  A CONDUCTIVE THERMOPLASTIC POLYMER SEAL             │
     └──────────────────────────────────────────────────────┘
                              ↓
     ┌──────────────────────────────────────────────────────┐
412 ─│  DIRECTING MOVEMENT OF THE HIGH-VELOCITY SPRAYER, SAID│
     │  MOVEMENT DIRECTED BY A ROBOT STRUCTURE IN COMMUNICATION│
     │  THE HIGH-VELOCITY SPRAYER, SAID ROBOTIC STRUCTURE FURTHER│
     │  IN COMMUNICATION WITH A CONTROLLER                  │
     └──────────────────────────────────────────────────────┘
```

FIG. 16

THERMAL SPRAY PLASTIC COATING FOR EDGE SEALING AND FILLET SEALING

TECHNOLOGICAL FIELD

The present disclosure relates generally to the field of coatings and sealants. More specifically the present disclosure relates to the field of coatings and sealants, including conductive coatings and sealants, particularly those coatings and sealants applied to a surface by thermal spraying.

BACKGROUND

In many fields, components on large structures, including those found on vehicles, including aircraft, etc., are typically coated with paints, primers, coatings, etc. that can provide a number of important functions to a substrate surface, including, for example, protection from corrosion and other forms of environmental degradation, overcoat or sealant adhesion, abrasion resistance, appearance, etc. Coating and sealants are often applied to areas of assembled components or sub-assemblies that are difficult to access through traditional coating and sealant application processes. In addition, a significant number, sometimes numbering in the thousands and tens of thousands, of small parts (e.g., fasteners, etc.) and areas requiring sealing (e.g., edge seals and fillet seals, etc.) requiring coatings and/or sealants can occur in assemblies in a large structure (e.g., fuel tanks on aircraft, etc.). Further, many coatings and sealants require lengthy curing protocols, or require applying heat or other added triggering mechanism (e.g. ultraviolet radiation, etc.) to obtain an appropriate degree of curing.

Further, some coatings (e.g. paints and primers, etc.) and sealants are often electrically insulative and can result in an impediment to the dissipation of static and other electrical charges. However, certain structures require the need to dissipate electrical charges that build up on a structure's interior and/or exterior surfaces, including static electrical charges, and charges resulting from, for example lightning strikes, etc. The need for electrical charge dissipation is increasingly important in the aircraft industry, as aircraft manufacture continues to incorporate non-metallic materials. Further, in certain aircraft assemblies, non-metallic materials, such as composites, plastics, etc., that do not dissipate electrical charges predictably across their surfaces may be joined with, or otherwise contact, assemblies and sub-assemblies that comprise metallic materials that do conduct electrical charges. That is, components, assemblies and sub-assemblies that include both composite and metallic materials may be used in the manufacture of, or otherwise incorporated into, larger structures (e.g. aircraft).

Such structures may encounter electromagnetic effects (EMEs) including, for example, and without limitation, lightning strikes. When a structure encounters an EME, the charge delivered to the structure travels throughout any conductive path, and can cause damage to exposed dielectric materials including, for example, composite materials. The electrical damage to composite materials from EMEs can be exacerbated if the edges of the composite material comprise exposed carbon fibers. If the path of charges resulting from an EME encounters varying materials having varying conductivities, damage at or near the material interface can occur. Such interfaces include, without limitation, fasteners/substrate interfaces, and can further include joined interfaces where, for example, seals (e.g., fillet seals, edge seals etc.) occur.

Carbon fiber reinforced plastic materials (CFRPs) have utility in structures including, without limitation, vehicles including, without limitation, aircraft. CFRPs comprise a fiber material (e.g. carbon fibers, etc.) impregnated with a resin material (e.g. epoxy resin, acrylic resin, etc.) to make so-called prepregs. Prepregs are partially cured layers that can be manufactured into rolls that can yield unrolled sheets for use in composite material manufacture. Prepreg material, or "prepregs" can then be "laid-up" or "stacked" into multi-layered "stacks" that can be shaped on forming mandrels or other tooling, followed by curing or partially curing the shaped material to produce a composite material that, if desired, adopts desired and predetermined shapes and dimensions imparted by the tool, with the composite material having desired weight and strength. Alternately, prepregs may be oriented into a stack that is trimmed and cured to form a solid stack for use as a composite material structure or other type of composite component.

In aircraft manufacture, CFRP parts are often joined to other CFRP parts as well as other metallic parts and non-metallic parts. Problems can occur with respect to predictably dissipating electrical charges when materials, such as CFRPs and various metals (e.g. aluminum, titanium, etc.) that have differing conductivities are joined, fastened, or are otherwise in close proximity to one another. Such interfaces can sustain EME damage in the course of EME events such as, for example, static discharge and/or lightning strikes where electrical current builds up and is not dispersed efficiently due to the presence of materials having differing conductivities/resistivities, as electrical charges move along a pathway. This is especially problematic at component interfaces where two materials are joined or in contact with one another and the materials have varying resistivity values (e.g., where a first substrate/component/part is made from a conductive material and is joined to or positioned proximate to a second substrate/component/part made from a non-conductive material or a material with a significantly different conductivity resistivity as compared to the first substrate/component/part.

Coatings, especially coatings used in aircraft manufacture, also must be robust enough to possess a plurality of characteristics, but may not adequately provide all of the required functions to an equivalent or acceptable degree. For example, conductive coatings for dissipating electrical charges across metallic and non-metallic coatings alike have been tried with varying success. However, the known conductive coatings must be loaded with conductive particles to such an extent (sometimes as much as 50-70 weight percent), that other required coating characteristics suffer. Further, such heavily loaded conductive coatings can make certain coating application techniques difficult or impossible (e.g., high viscosity coating materials cannot be applied using, for example, spray techniques, etc.).

In addition, surface coatings that may be designed to alleviate electrical imbalances across various metallic and/or non-metallic surfaces must often, at least in part, address additional concerns and functions including appearance, adhesion, abrasion resistance, environmental degradation, etc.

Further, inherent coating characteristics (viscosity, etc.,) may make it difficult to apply such coatings to restrictive locations and surfaces using efficient application techniques. For example, an otherwise desirable coating may be too viscous to apply to a surface using sprayers, when an application mode such as spraying could otherwise offer improvements to coating processing in terms of, efficiency, cost savings, etc.

In addition, specialized coatings having a useful range of varying properties may be expensive to prepare, maintain, store, or deploy. Otherwise useful coatings may further have long curing times, for example taking days to cure with or without the presence of elevated curing temperatures or the use of additional triggering processes. Such extended or complex curing regimens further add to the manufacturing time required, as well as increasing cost. In addition, specialized coatings may lack an adequate shelf life or pot life to be useful for very long on-site. It may further be economically impractical for a particular manufacturing facility (in terms of equipment or space requirements) to store and/or inventory coatings that require, for example, maintenance at particular temperatures.

SUMMARY

According to a present aspect, an assembly is disclosed, with the assembly comprising a first substrate; a second substrate, with at least one of said first substrate and second substrate comprising at least one first substrate edge and at least one second substrate edge and with the second substrate located proximate to the first substrate to form a substrate interface between the first substrate and the second substrate; and a spray-deposited thermoplastic polymer sealant configured to form a thermoplastic polymer seal.

In another aspect, the spray-deposited thermoplastic polymer sealant comprises at least one thermoplastic polymer, said thermoplastic polymer comprising at least one of: nylon, polyetheretherketone, polyetherketoneketone, polyamide, polyphenylsulfide, polyphenylsulfone, polysulfone, and polyetheramide.

In another aspect, the spray-deposited thermoplastic polymer sealant further comprises a conductive material comprising at least one of: titanium, nickel alloy, copper, carbon black, graphene powder, and carbon nanotubes.

In another aspect, the thermoplastic polymer sealant has a Young's modulus ranging from about 1 Mpa to about 4 GPa.

In a further aspect, the spray-deposited thermoplastic polymer sealant has a resistivity value ranging from about $1 \times 10^5$ to about $1 \times 10^8$ ohm-m.

In another aspect, the thermoplastic polymer seal comprises at least one of: a fillet seal and an edge seal.

In a further aspect. an object comprises an assembly comprising a first substrate; a second substrate, with at least one of said first substrate and second substrate comprising at least one first substrate edge and at least one second substrate edge and with the second substrate located proximate to the first substrate to form a substrate interface between the first substrate and the second substrate; and a spray-deposited thermoplastic polymer sealant configured to form a thermoplastic polymer seal.

In another aspect, the object is a vehicle selected from the group consisting of: a manned aircraft; an unmanned aircraft; a manned spacecraft; an unmanned spacecraft; a manned rotorcraft; an unmanned rotorcraft; a manned terrestrial vehicle; a unmanned terrestrial vehicle; a unmanned terrestrial vehicle; a manned surface water borne vehicle; an unmanned surface water borne vehicle; a manned subsurface water borne vehicle and an unmanned sub-surface water borne vehicle.

According to a present aspect, a spray-deposited thermoplastic polymer sealant is disclosed, with the sealant comprising a thermoplastic polymer comprising at least one of: nylon, polyetheretherketone, polyetherketoneketone, polyamide, polyphenylsulfide, polyphenylsulfone, polysulfone, and polyetheramide.

In another aspect, the thermoplastic polymer sealant further comprises a conductive material comprising at least one of: titanium, nickel alloy, copper, carbon black, graphene powder, or carbon nanotubes.

Another present aspect discloses a method for depositing a thermoplastic polymer sealant material to a substrate surface, with the method comprising delivering at least one thermoplastic polymer powder feedstock to a high-velocity sprayer, with the first thermoplastic polymer powder comprising at least one of: nylon, polyetheretherketone, polyetherketoneketone, polyamide, polyphenylsulfide, polyphenylsulfone, polysulfone, and polyetheramide. The method further comprises forming a thermoplastic polymer sealant material, directing the thermoplastic polymer sealant material from the high-velocity sprayer to a substrate surface, and depositing an amount of the thermoplastic polymer sealant material onto the substrate surface to form a thermoplastic polymer seal, said thermoplastic polymer seal deposited to an average thickness ranging from about 10 μm to about 2000 μm, wherein the high-velocity sprayer is a thermal sprayer or a cold sprayer.

In another aspect, in the step of directing the thermoplastic polymer sealant material from the high-velocity sprayer to the substrate surface, the method further comprises directing movement of the high-velocity sprayer, said movement directed by a robot, said robot in communication with the high-velocity sprayer, said robotic further in communication with a controller.

In a further aspect, substantially concurrently with delivering at least one thermoplastic polymer powder to the high-velocity sprayer a method further comprises delivering a conductive powder feedstock to the high velocity sprayer, with the conductive powder comprising a conductive material powder comprising at least one of: titanium, nickel alloy, copper, carbon black, graphene powder, or carbon nanotubes.

In another aspect, the method further comprises forming a conductive thermoplastic polymer sealant material; and depositing an amount of the conductive thermoplastic sealant material onto the substrate surface to form a conductive thermoplastic polymer seal.

In a further aspect, the method further comprise combining the at least one thermoplastic polymer powder with the conductive powder to form a conductive thermoplastic powder feedstock mixture.

In another aspect, the thermoplastic polymer seal has a resistivity ranging from about $1 \times 10^5$ to about $1 \times 10^8$ ohm-m.

In a further aspect, in the step of directing the thermoplastic polymer powder feedstock from the high-velocity sprayer to a substrate surface, the method further comprises directing movement of the high-velocity sprayer, said movement directed by a robot in communication with the high-velocity sprayer, said robot further in communication with a controller.

BRIEF DESCRIPTION OF THE DRAWINGS

Figure 1:
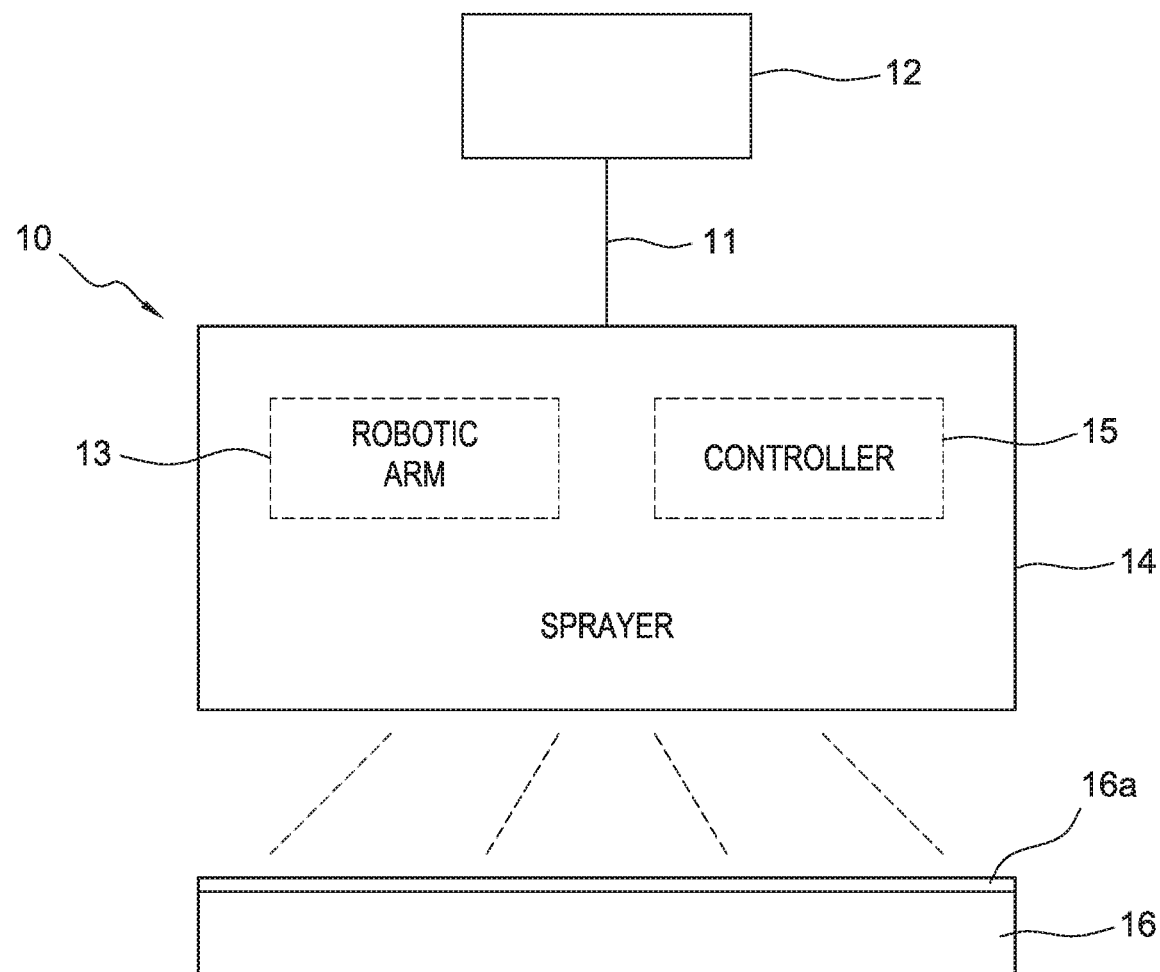
Figure 2A:
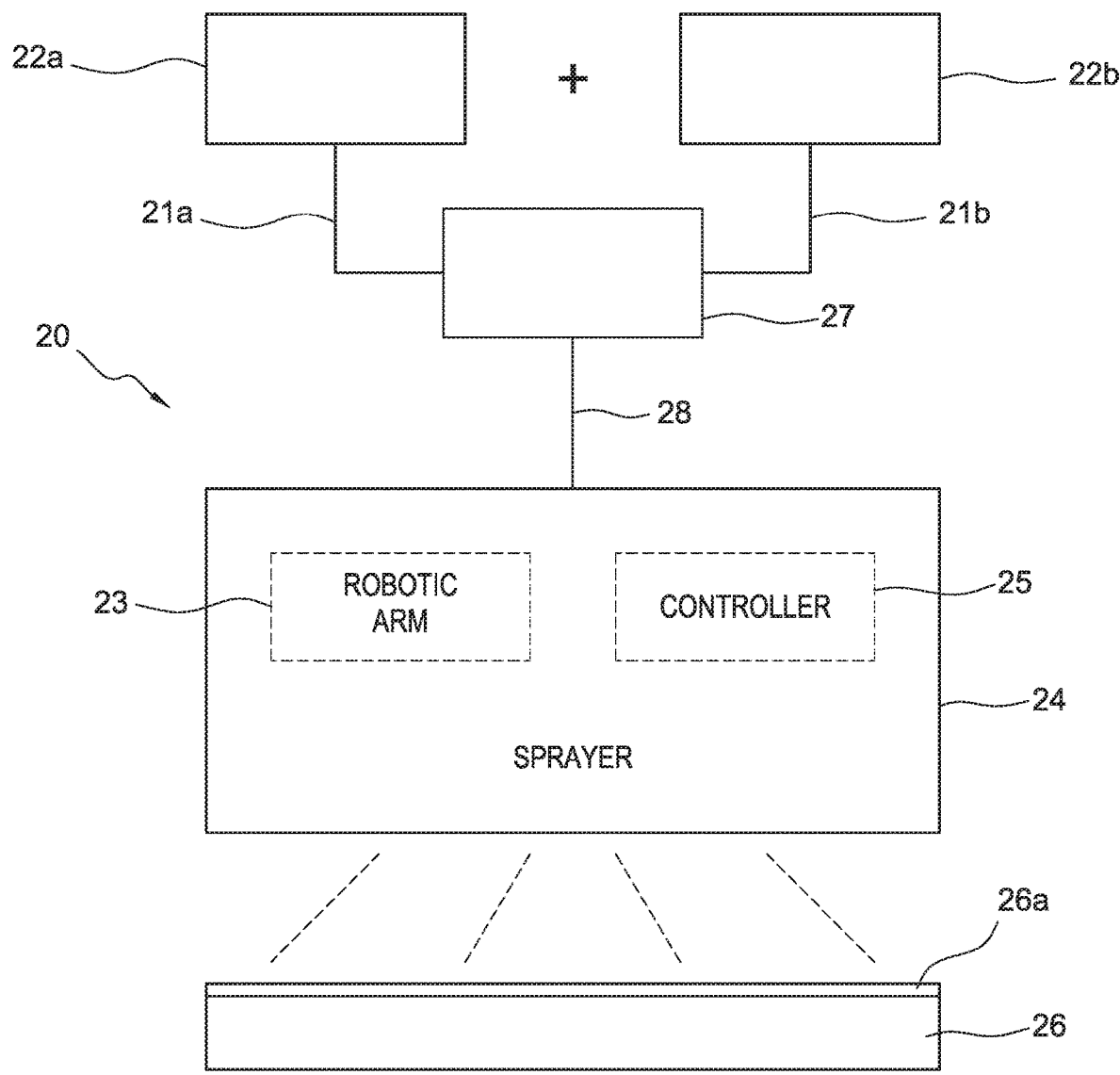
Figure 2B:
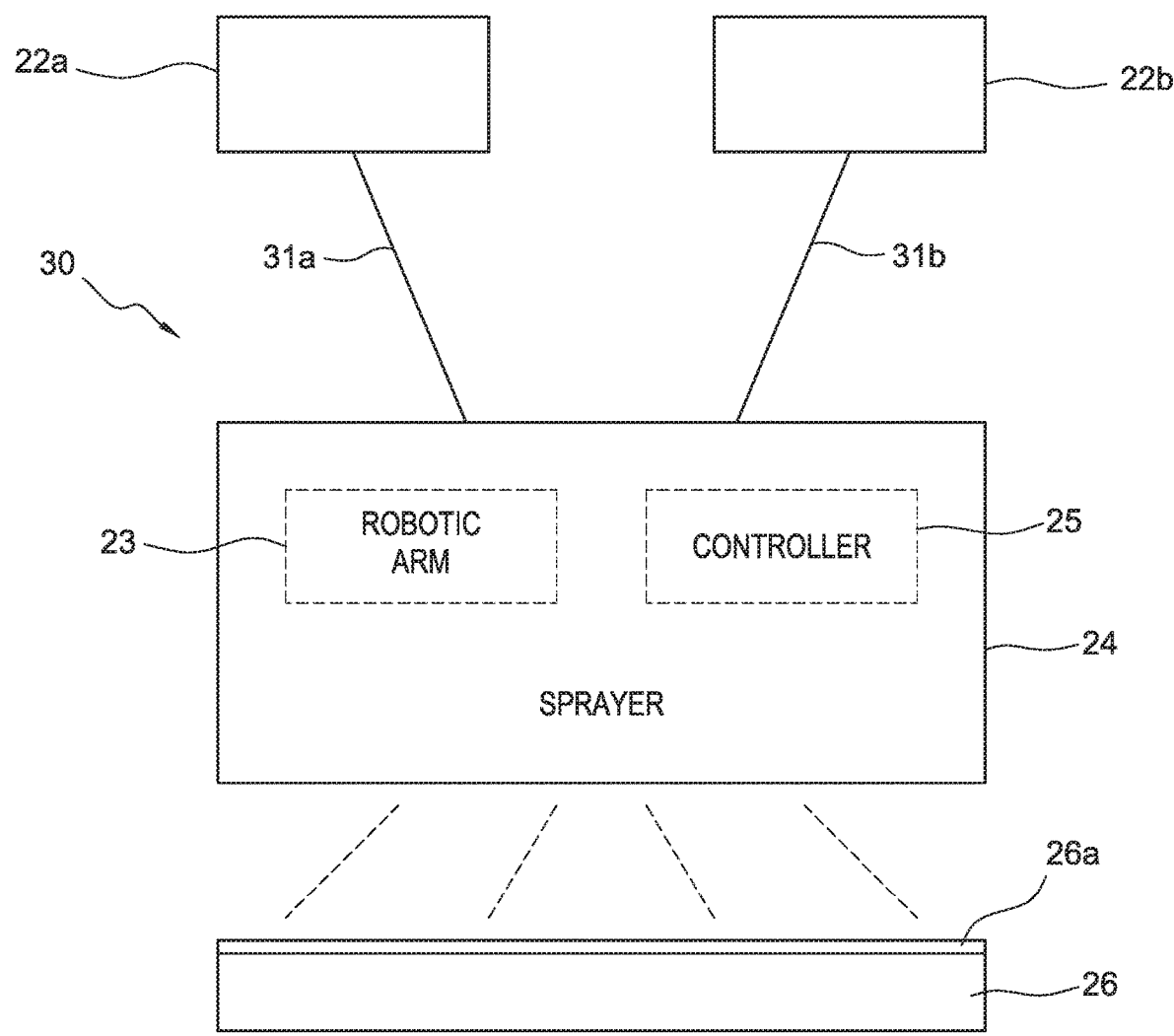
Figure 3A:
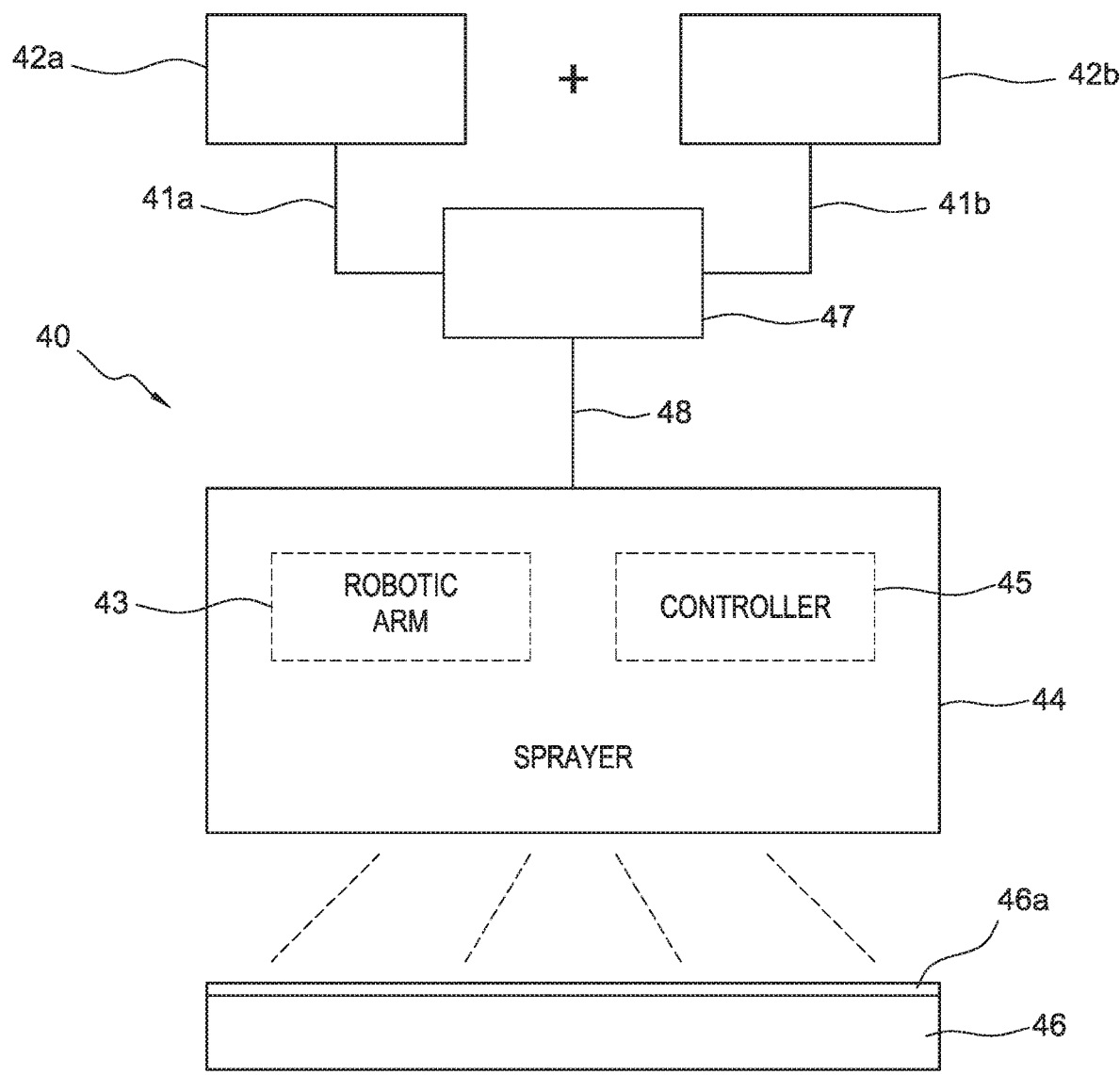
Figure 3B:
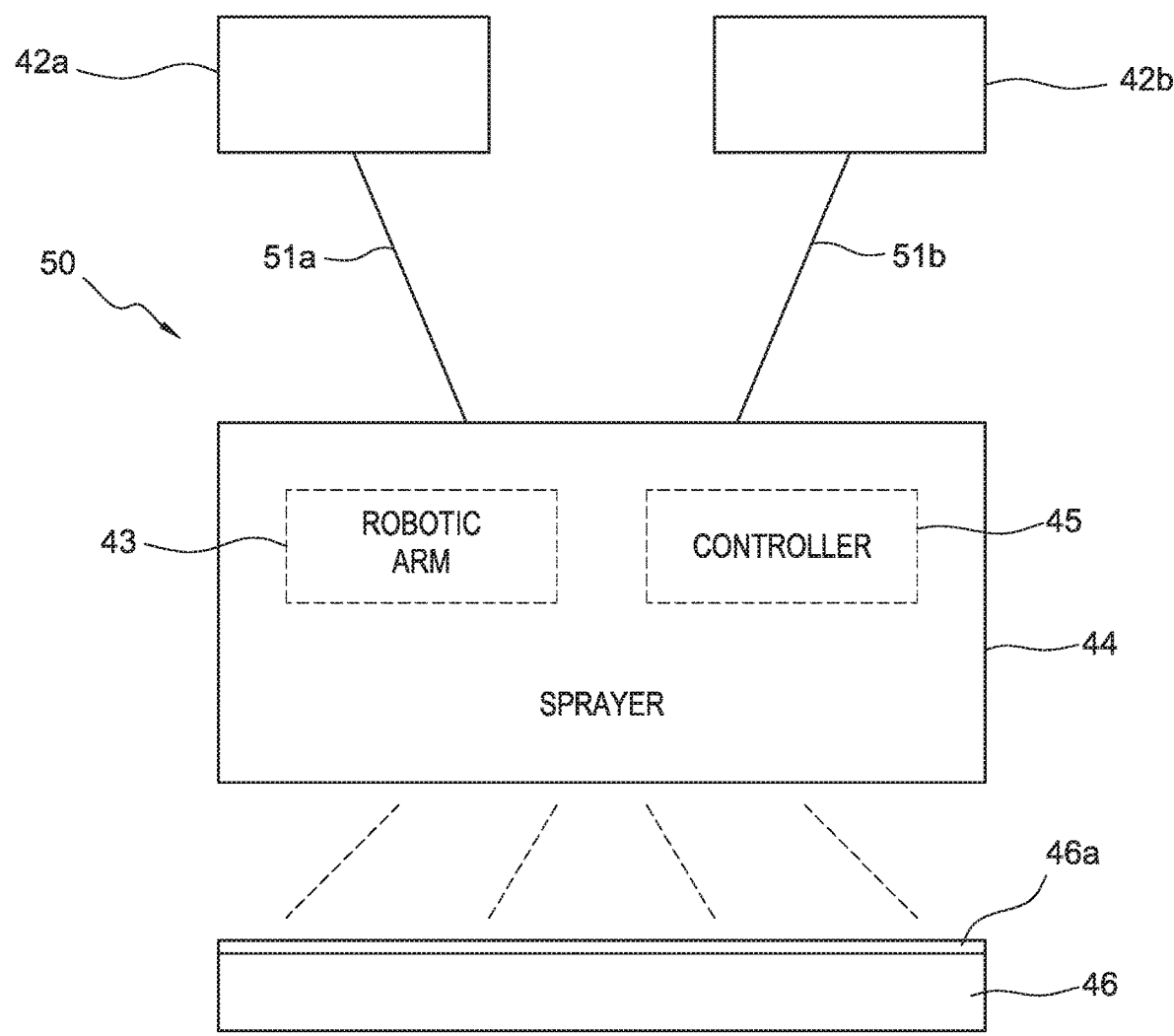
Figure 4A:
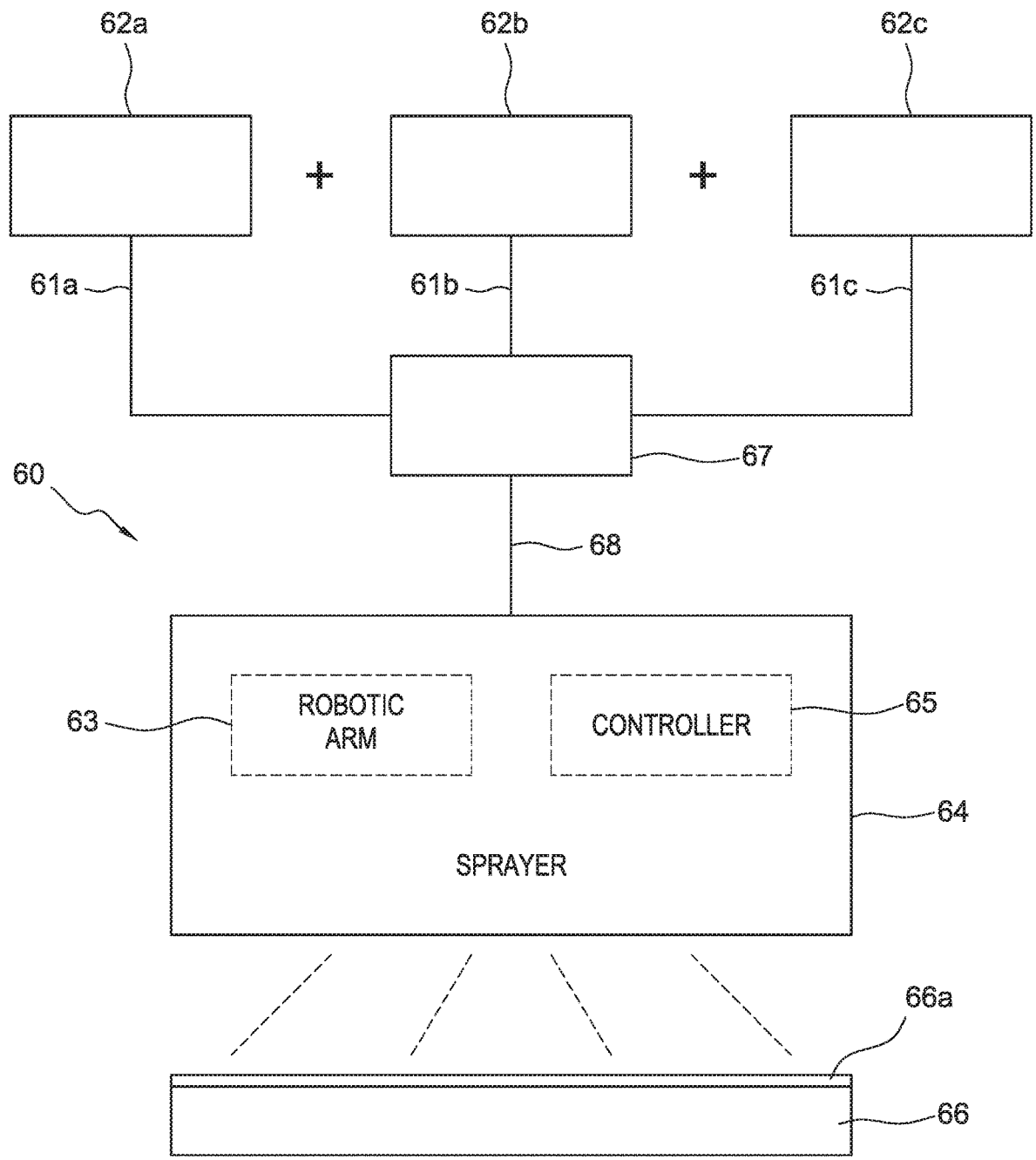
Figure 4B:
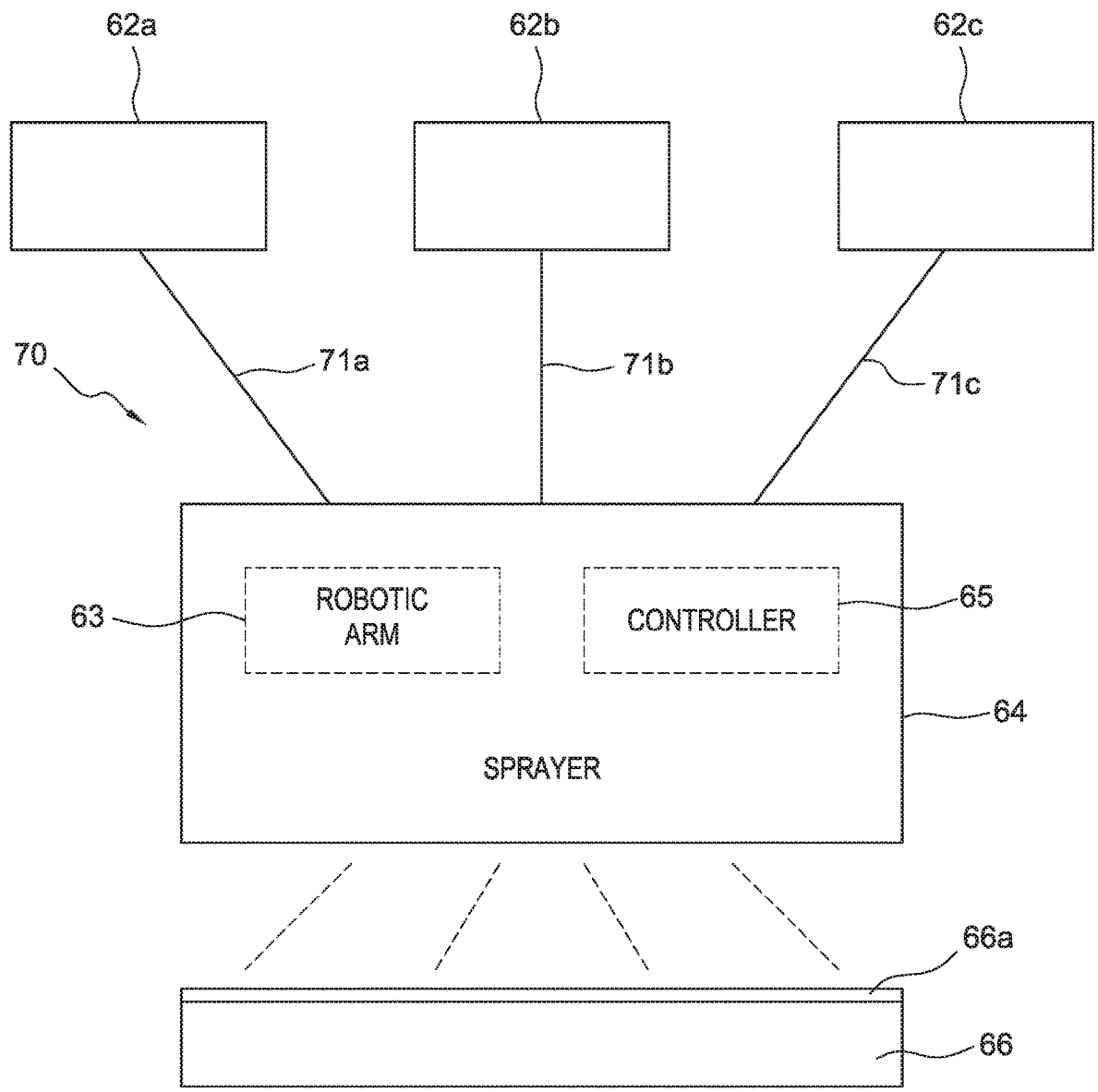
Figure 5:
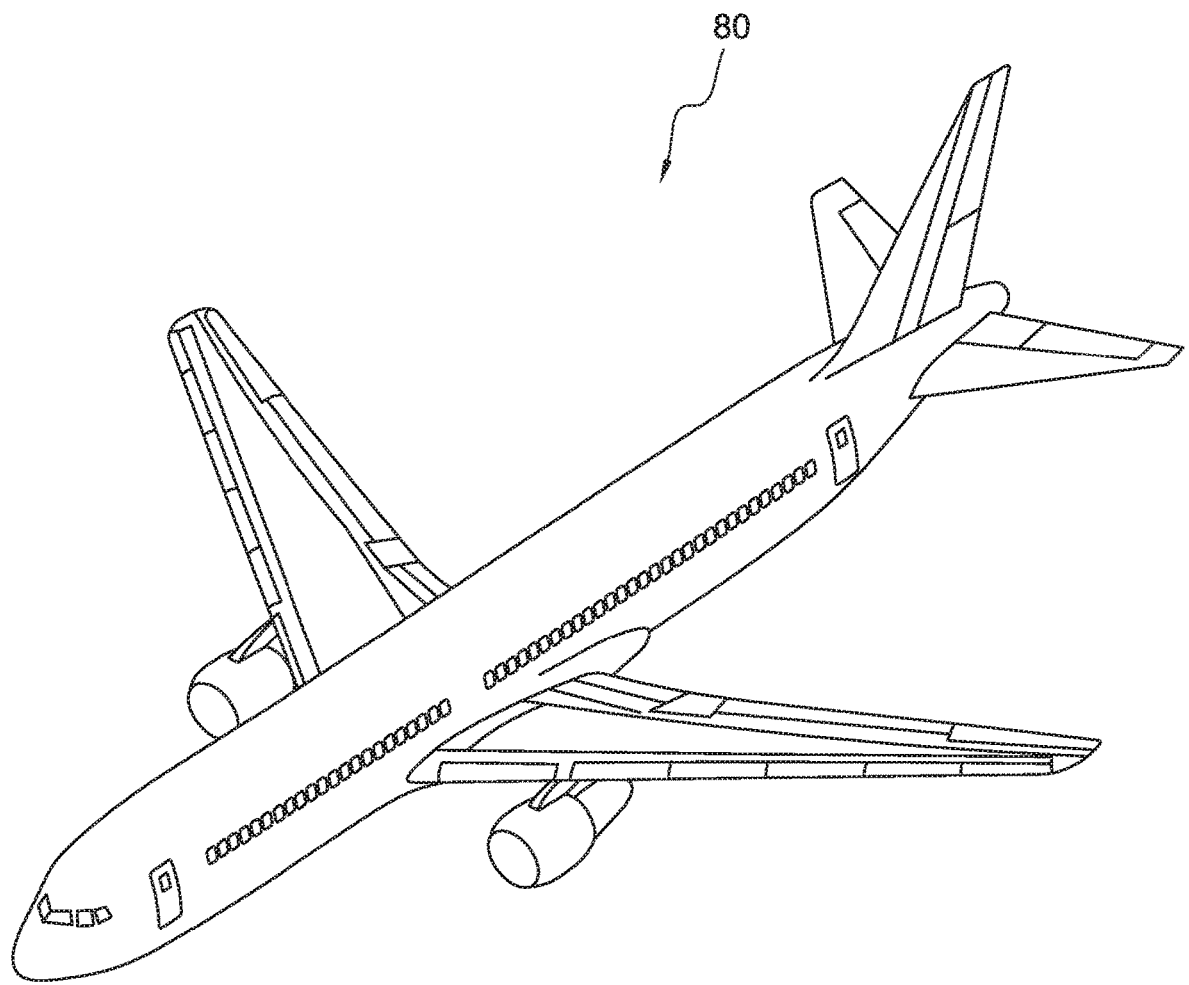
Figure 6:
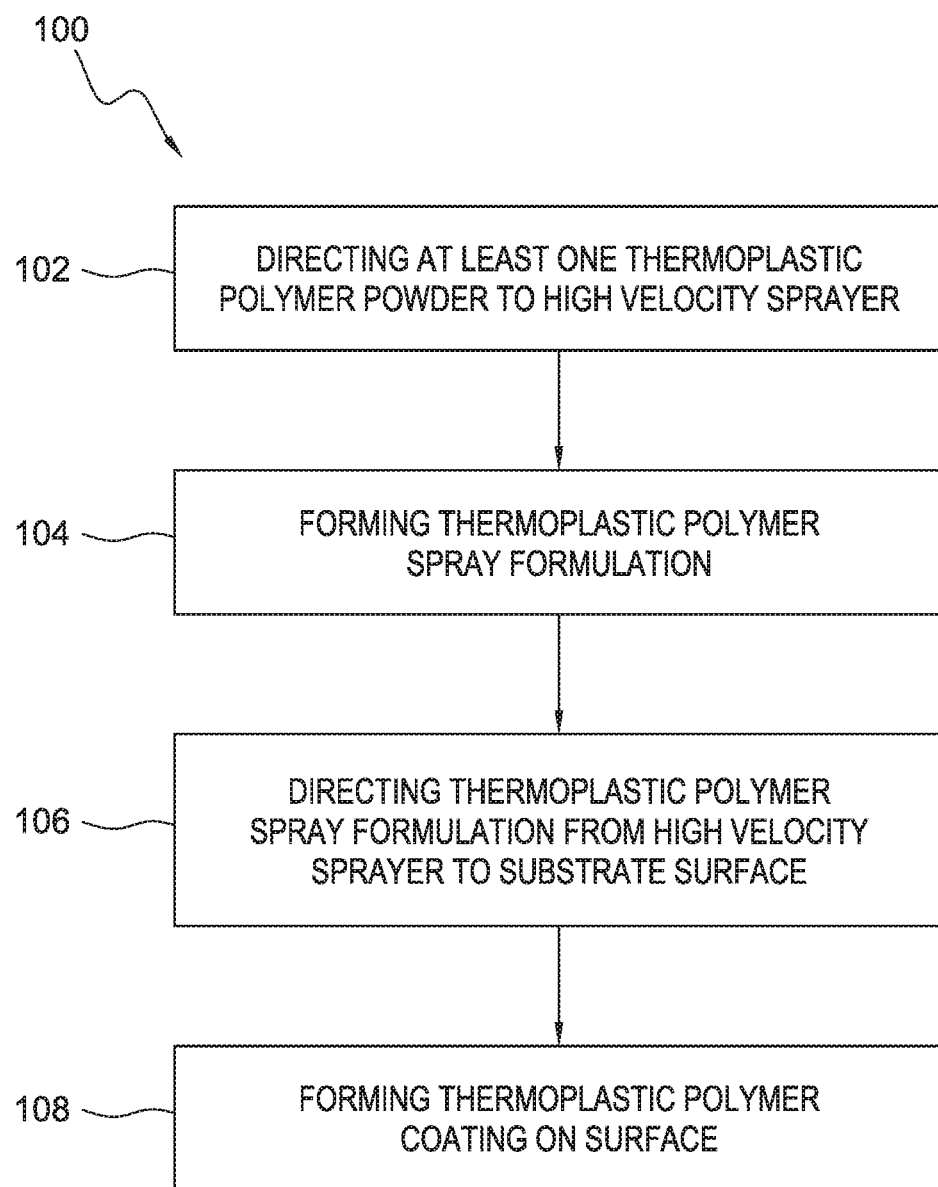
Figure 7:
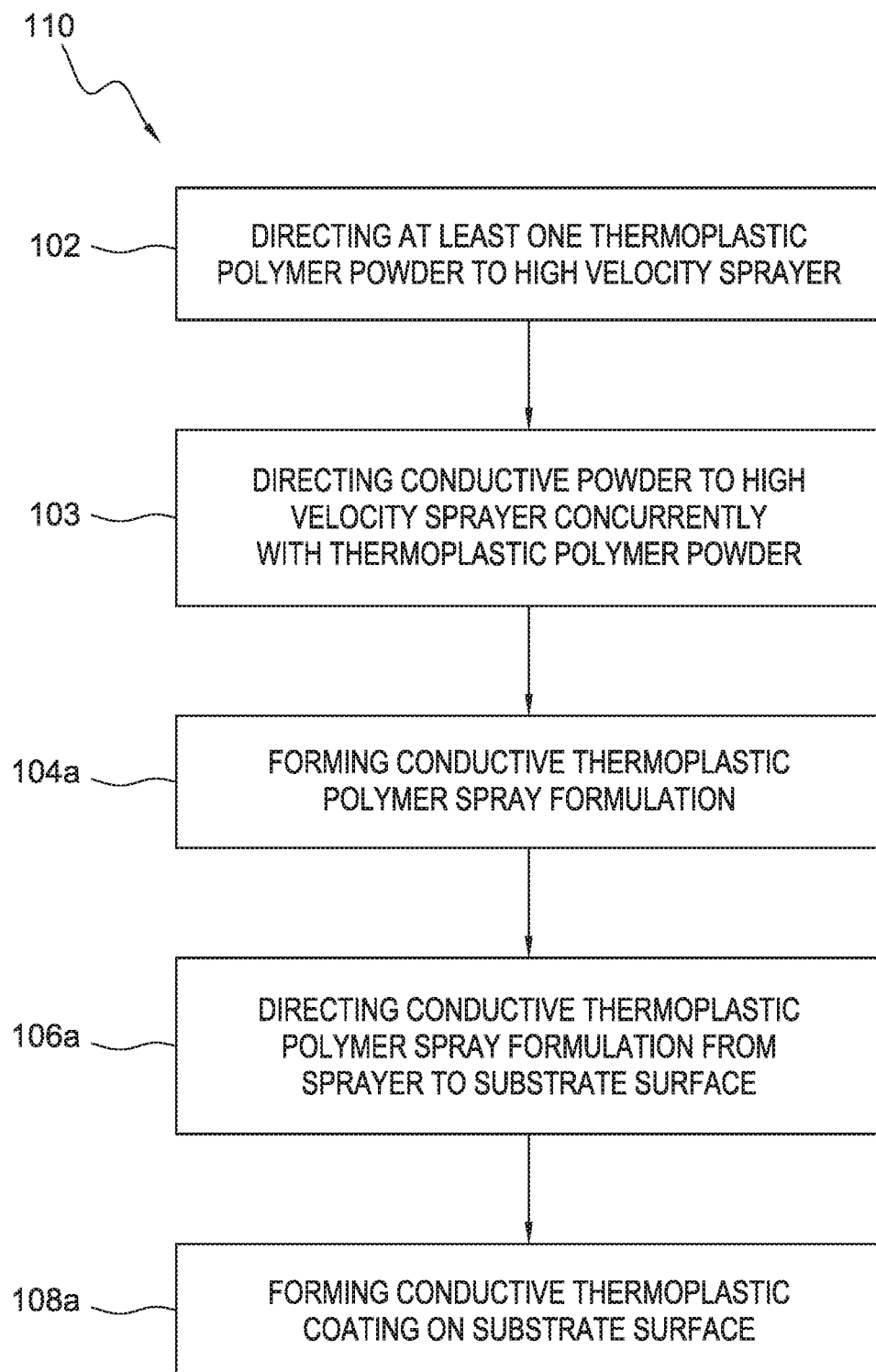

Having thus described variations of the disclosure in general terms, reference will now be made to the accompanying drawings, which are not necessarily drawn to scale, and wherein:

FIG. 1 is an illustration of an aspect of the present disclosure showing a thermoplastic polymer powder feedstock and a system including the thermoplastic polymer powder feedstock and a high-velocity sprayer for depositing a thermoplastic polymer coating onto a substrate surface;

FIG. 2A is an illustration of an aspect of the present disclosure showing the mixing of more than one thermoplastic polymer powder feedstocks to form a thermoplastic powder feedstock mixture for use as a spray formulation, and a system including the thermoplastic powder feedstock mixture and a high-velocity sprayer for depositing a tunable thermoplastic polymer coating onto a substrate surface;

FIG. 2B is an illustration of an aspect of the present disclosure showing a plurality of thermoplastic powder feedstocks delivered via separate feedlines to the sprayer shown in FIG. 2A, and a system for depositing a tunable thermoplastic polymer coating onto a substrate surface;

FIG. 3A is an illustration of an aspect of the present disclosure showing at least one thermoplastic polymer powder feedstock mixed with at least one conductive powder feedstock to form a conductive thermoplastic powder feedstock mixture, and a system including the conductive thermoplastic polymer powder feedstock mixture and a high-velocity sprayer for depositing a conductive thermoplastic polymer coating onto a substrate surface;

FIG. 3B is an illustration of an aspect of the present disclosure showing at least one thermoplastic polymer powder feedstock and a conductive powder feedstock shown in FIG. 3A, and a system including a high-velocity sprayer for depositing a conductive thermoplastic polymer coating onto a substrate surface, with more than one thermoplastic polymer powder feedstock and the one or more conductive powder feedstock delivered or directed to the sprayer via separate feed lines;

FIG. 4A is an illustration of an aspect of the present disclosure showing more than one thermoplastic polymer powder feedstocks mixed with a conductive powder feedstock to form a conductive thermoplastic powder feedstock mixture, and a system including the conductive thermoplastic polymer powder feedstock mixture and a high-velocity sprayer for depositing a conductive thermoplastic polymer coating onto a substrate surface;

FIG. 4B is an illustration of an aspect of the present disclosure showing two different thermoplastic polymer powder feedstocks and a conductive powder feedstock shown in FIG. 4A, and a system including the two different thermoplastic polymer powder feedstocks, the conductive powder feedstock and a high-velocity sprayer for depositing a conductive thermoplastic polymer coating onto a substrate surface, with the two thermoplastic polymer powder feedstocks and the conductive powder feedstock delivered or directed to the sprayer via separate feed lines;

FIG. 5 is an illustration of an aircraft;

FIG. 6 is a flowchart outing a method according to aspects of the present disclosure;

FIG. 7 is a flowchart outing a method according to aspects of the present disclosure; and FIG. 8 is a flowchart outing a method according to aspects of the present disclosure.

Figure 9:
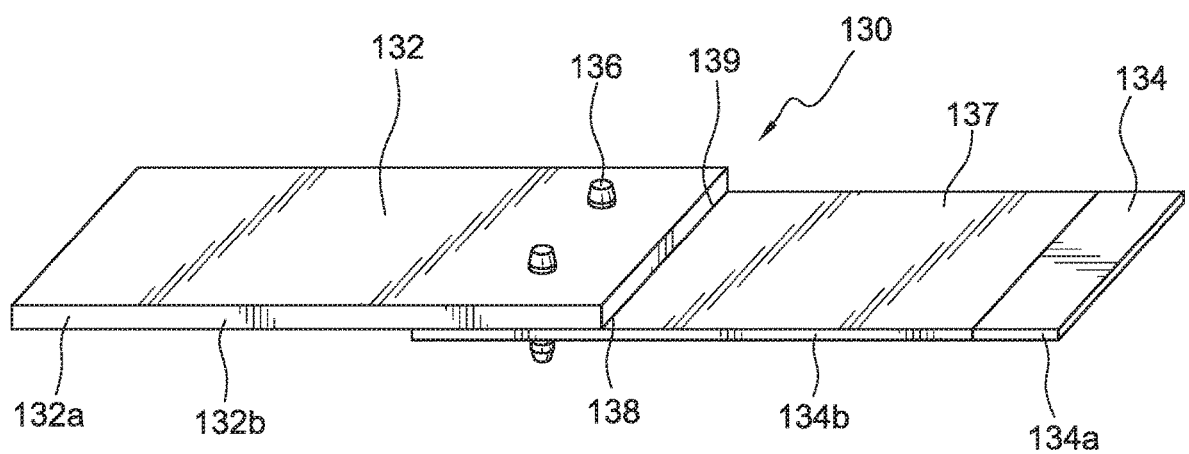
Figure 10:
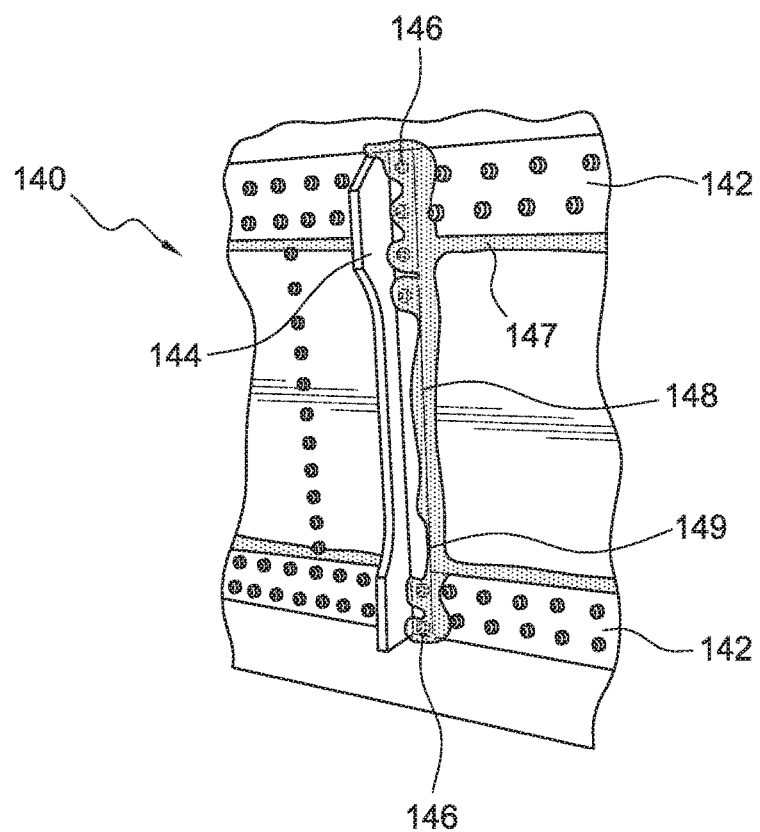
Figure 11:
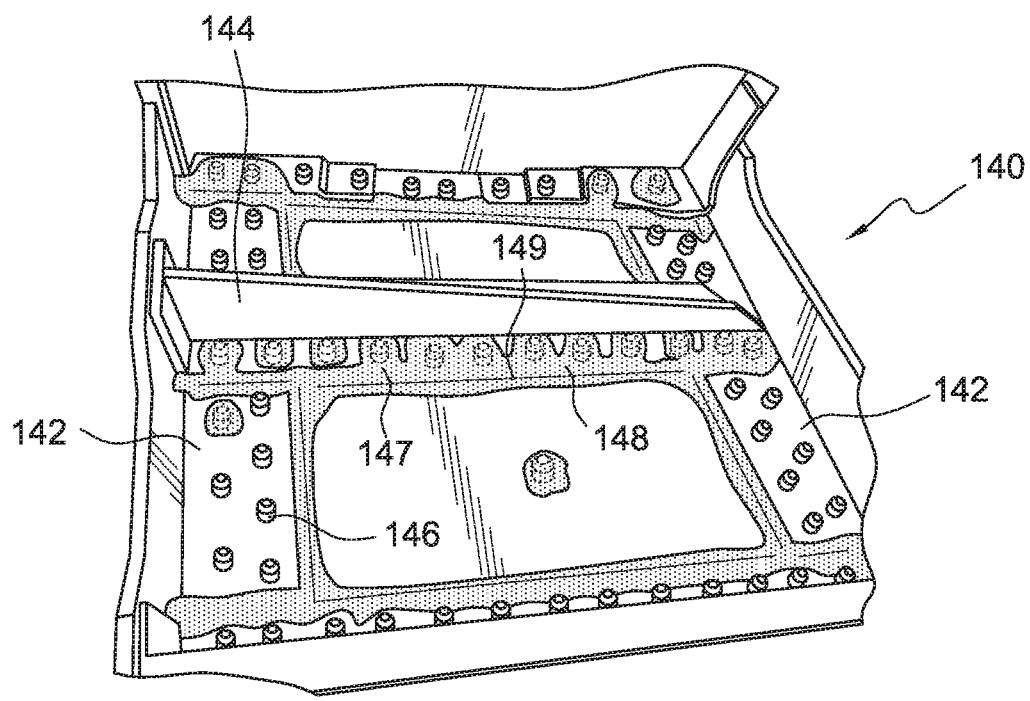
Figure 12:
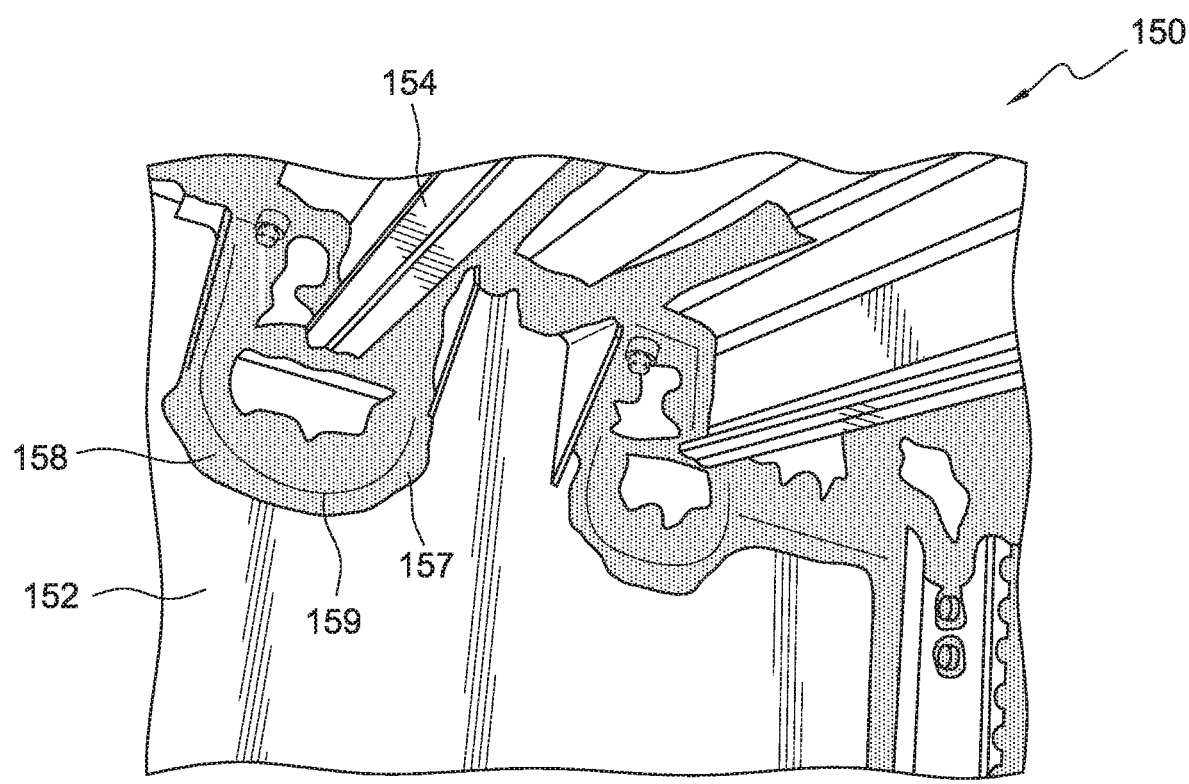
Figure 14:
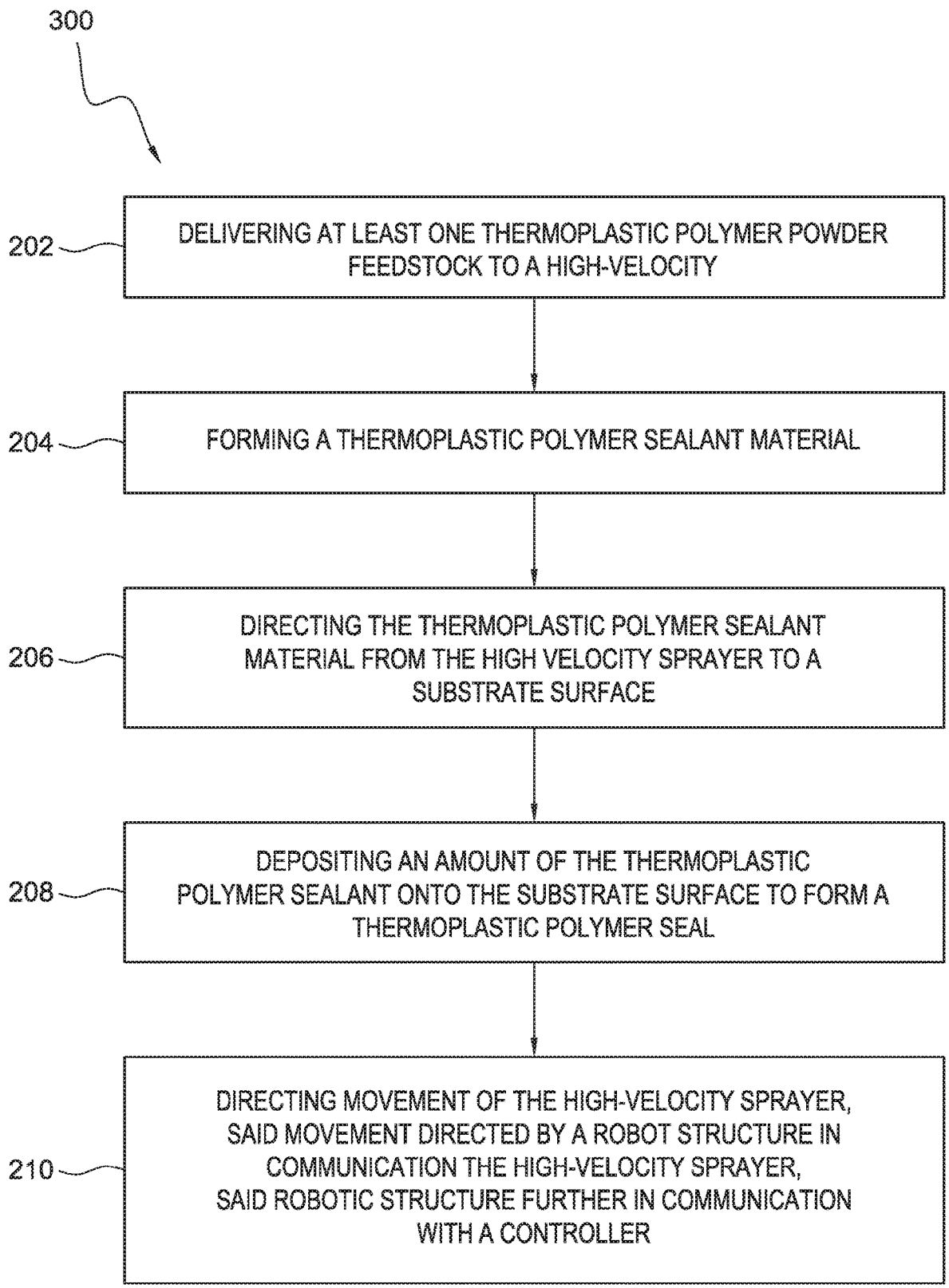
Figure 15:
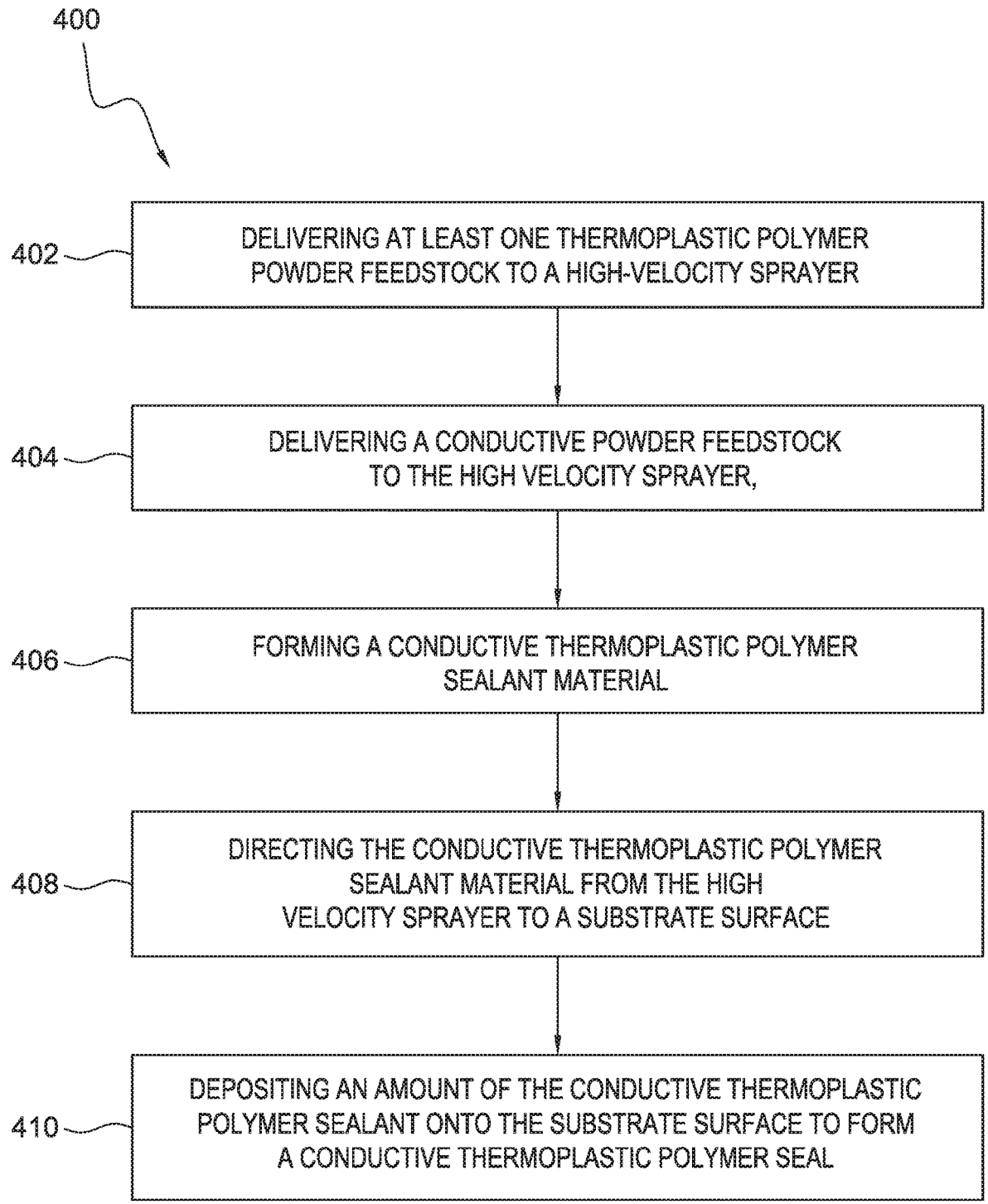

FIG. 9 is an illustration of two parts, or substrates fastened together and forming fillet seals at their juncture and having fillet seals and edge seals with sealant applied according to aspects of the present disclosure;

FIG. 10 is an illustration of a fillet seal with a sealant applied according to an aspect of the present disclosure;

FIG. 11 is an illustration of a fillet seal with a sealant applied according to an aspect of the present disclosure;

FIG. 12 is an illustration of a fillet seal with a sealant applied according to an aspect of the present disclosure;

FIG. 13 is a flowchart outlining methods according to aspects of the present disclosure;

FIG. 14 is a flowchart outlining methods according to aspects of the present disclosure;

FIG. 15 is a flowchart outlining methods according to aspects of the present disclosure; and FIG. 16 is a flowchart outlining methods according to aspects of the present disclosure.

DETAILED DESCRIPTION

Aspects of the present disclosure are directed to powdered thermoplastic formulations that can be tunable, or otherwise have their characteristics changed in real time during deposition and that can include conductive materials and that can also be conductively tunable. The powdered thermoplastic polymer feedstocks can include at least one conductive powdered material to form a conductive thermoplastic powder feedstock mixture that can be deposited onto a substrate surface via a high-velocity sprayer to form a tunable conductive thermoplastic coating on a substrate surface, with the conductive thermoplastic coating having predetermined characteristics.

Aspects of disclosed thermoplastic polymer powder powdered conductive coating formulations can be tuned or tailored, including in real time, to provide a wide range of required coating characteristics, while also providing robust protective coating qualities to the substrates being coated with the presently disclosed thermoplastic coatings.

According to further aspects, powdered conductive thermoplastic polymer coating formulations (that contain a conductive powder) can be tuned or tailored, including in real time, and provide a wide range of required characteristics for electrically conductive thermoplastic coatings offering a particular, and wide-ranging amount of resistivity or conductivity, while also providing robust protective qualities to the substrates being coated with the presently disclosed conductive thermoplastic coatings.

Additionally, aspects of the present disclosure are directed to thermoplastic polymer powder coating formulations that can be tailored as precursor feedstock mixtures, or that can be delivered substantially concurrently or in predetermined sequence to a sprayer (e.g., a predetermined programmed sequence) from separate feedstock sources or supplies to a high velocity sprayer. The sprayer then delivers the thermoplastic polymer powder coating formulations to form a thermoplastic coating, using high-velocity spraying techniques, to metallic and/or non-metallic substrates and components, with the thermoplastic coatings having predetermined characteristics that can be tuned in real time (e.g., in real time during application to a substrate surface, etc.). When a conductive powdered feedstock material is present in the thermoplastic polymer powder feedstock, various characteristics of the resulting applied conductive thermoplastic coatings can be predictably tailored, even in substantially real-time, by changing the proportions of powdered feedstock constituents (e.g., the proportion(s) of the at least one thermoplastic polymer powder feedstock and the conductive powder feedstock) that are provided to the sprayer.

Without being limiting, the average particle size of the thermoplastic polymer powder feedstock(s) used according to aspects of the present disclosure range from about 20 μm to about 300 μm. In addition, without being limiting, the average particle size of the conductive powder feedstock(s) used according to aspects of the present disclosure range from about 5 μm to about 80 μm. The high-velocity sprayers used in connection with aspects of the present disclosure include sprayers able to disperse a feedstock at velocities ranging from about 20 m/s to about 1200 m/s. Such sprayers include thermal (e.g., flame sprayers, etc.) and cold sprayers.

According to one aspect, the thermoplastic polymer powder feedstock comprises at least one of a nylon, polyetheretherketone (equivalently referred to as PEEK), polyetherketoneketone (equivalently referred to as PEKK), polyamide, polyphenylsulfide, polyphenylsulfone, polysulfone, and polyetheramide. Further thermoplastic polymer powder feedstocks include at least one thermoplastic polymer powder comprising at least one of: copolymers including Hytrel® TPC-ET (DuPont®), thermoplastic elastomers, and thermoplastic fluoroelastomers including DAI-EL® T-530 (Daikin®).

In further aspects, the thermoplastic polymer powder feedstock comprises at least one of a thermoplastic polyester elastomer powder or a thermoplastic fluoroelastomer powder. Contemplated thermoplastic elastomer powders include those that can be obtained as PEEK, PEKK, Hytrel® 5526 (DuPont); Dai-El™, (Daikin®); Hipex®, (Kraiburg), etc. The thermoplastic polymer powder feedstocks preferably have an average particle size ranging from about 20 µm to about 300 µm.

Polyether ether ketone (PEEK) is an organic thermoplastic in the polyaryletherketone (PAEK) family, with PEEK having the general formula:

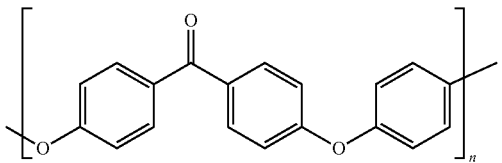

PEEK has a coefficient of thermal expansion value (depending upon grade) ranging from of about 20 to about 80 ppm/° F. (i.e. about 2 to about $8 \times 10^{-5}$ in./in./° F.), a Young's modulus value of about 3.6 GPa and a tensile strength ranging from about 90 MPa to about 100 MPa. PEEK is highly resistant to thermal degradation as well as attack by both organic and aqueous environments (e.g. environments including, without limitation, those environments coming into contact with fuels and fuel systems, etc.), and has a high resistance to biodegradation.

According to another, and as also presented in the Examples below, ret polymer powder. Polyetherketoneketone (PEKK) is a semi-crystalline thermoplastic in the PAEK family, with PEKK having the general formula:

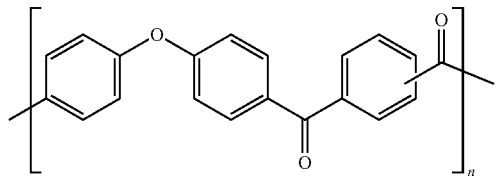

PEKK has a coefficient of thermal expansion value (depending upon grade) of about 10 to about 20 ppm/° F. (i.e. about 1 to about $2 \times 10^{-5}$ in./in./° F.), a Young's modulus value of about 4.5 GPa and a tensile strength of about 102 MPa. PEKK is also highly resistant to thermal degradation as well as attack by both organic and aqueous environments (e.g. environments including, without limitation, those environments coming into contact with fuels and fuel systems, etc.), and has a high resistance to biodegradation.

The density of the contemplated thermoplastic polymer coating deposited onto a substrate surface can be of any desired thickness, but is particularly deposited at a thickness ranging from about 25 µm to about 5 mm, with the contemplated thermoplastic coatings having a material density ranging from about 1.0 g/cc to about 1.8 g/cc). Being able to deposit a thermoplastic coating having such tailorable and predetermined densities and deposited to such desired thicknesses at reduced densities realizes substantial weight reduction compared with material coatings presently used in, for example, aircraft production where overall weight impacts vehicle range, fuel consumption, available cargo capacity, manufacturing time, etc., all of which can impact total production cost.

If desired, according to further contemplated aspects, the thermoplastic coatings (and when conductive components are present to form conductive thermoplastic coatings, such resulting conductive thermoplastic coatings) can be tailored or "tuned", for example, in real time during the coating deposition process, such that the deposited coatings possess various desired and predetermined characteristics, e.g., physical, chemical, thermal, etc. Such aforementioned tailorable characteristics are in addition to the desired and tailorable conductivity or resistivity values achievable with the presently disclosed conductive thermoplastic coatings. This can be achieved by providing differing powdered thermoplastic polymer feedstock(s), differing amounts (e.g., differing comparative ratios, etc.) of differing powdered thermoplastic polymer feedstock(s), additional numbers of differing powdered thermoplastic polymer feedstock(s), or by providing additives to the powdered thermoplastic polymer feedstock(s).

According to other aspects, contemplated conductive powder feedstock materials include, without limitation, various metallic powders including titanium, nickel alloy, copper, carbon black, graphene powder, or carbon nanotubes. The contemplated conductive powder feedstock materials preferably have an average particle size ranging from about 5 µm to about 80 µm.

The powdered thermoplastic polymer feedstock formulations disclosed, according to aspects of the present disclosure, when combined or otherwise mixed with one or more conductive powder feedstock(s) produce a resulting conductive thermoplastic polymer feedstock mixture that yields a conductive thermoplastic polymer coating on a substrate surface, with the resulting conductive coating having a desired and predetermined resistivity ranging from about $1 \times 10e^5$ to $10e^{11}$ ohm-m, and more preferably ranging from about $1 \times 10e^5$ to $10e^8$ ohm-m.

According to present aspects, to provide a conductive thermoplastic coating on a substrate surface having a resistivity ranging from about $1 \times 10e^5$ to $10e^{11}$ ohm-m, and more preferably ranging from about $1 \times 10e^5$ to $10e^8$ ohm-m, the conductive thermoplastic polymer powder feedstock(s) have a relative percentage by volume of the conductive component (e.g. the conductive powder) ranging from about 1% to about 9% by volume of the total volume of conductive thermoplastic polymer powder feedstock(s) provided to the high-velocity sprayer.

It is further understood that the thermoplastic polymer powder (e.g., provided as a feedstock to the high-velocity sprayer) can be a mixture that is formed prior to the introduction of the multi-component feedstock to the high-velocity sprayer. In one aspect, when the powdered feedstock comprises more than one type of powder component (e.g. more than one type of thermoplastic polymer powder feedstock; one thermoplastic polymer powder feedstock and at least one type of conductive powder feedstock; more than one thermoplastic polymer powder feedstock and at least one type of conductive powder feedstock, etc.), the multiple component powder feedstock materials can be mixed together to form a thermoplastic (or conductive thermoplastic) polymer powder feedstock mixture, equivalently referred to herein as a "feedstock mixture". The feedstock mixture is then introduced as the feedstock to the sprayer. For the purpose of the present disclosure, the term "feedstock" refers to a material that is supplied from a supply of such material to a mixture and delivered to a high-velocity sprayer, or is that is supplied directly to a high-velocity sprayer via a feed line from a supply of the material.

In an alternate aspect, when the powdered feedstock comprises more than one type of powder component (e.g., more than one type of thermoplastic polymer powder feedstock; one thermoplastic polymer powder feedstock and at least one conductive powder feedstock; more than one type of thermoplastic polymer powder feedstock and at least one conductive powder feedstock, etc.), the multiple powdered feedstock components can be directed via separate feed lines to the sprayer, such that no multiple component powdered feedstock mixture is pre-formed (e.g., into a feedstock mixture) as a single feedstock component that is then provided to the high-velocity sprayer. According to this aspect, one or more controllers can be used to monitor and control the rate at which a single powdered feedstock is released from a supply and directed to the high-velocity sprayer. In this way, the individual flow rate of a particular powdered feedstock component is controlled, monitored and maintained to insure that a particular ratio of feedstock components that arrive at (e.g., are delivered to) the sprayer is achieved and, if desired, maintained for the duration of the material (e.g. coating) spray deposition onto a substrate surface. For example, in this aspect, to produce a conductive thermoplastic coating having a resistivity ranging from about $1 \times 10^5$ to about $1 \times 10^{11}$ ohm-m, the presence of an amount of conductive powder feedstock delivered to the sprayer ranges from about 1% to about 9% by volume of the combined powdered material feedstock delivered to the sprayer (e.g., the combined powdered material volume equaling the volume of thermoplastic polymer powder feedstock combined with the conductive powder feedstock volume, and, for example, controlled, monitored and maintained by regulating and/or sequencing the comparative flow rates of the individual component feedstocks fed via one or more feed lines to the sprayer, etc.).

According to present aspects, a formed conductive thermoplastic polymer powder feedstock mixture becomes the thermal sprayer feedstock material that is converted by the thermal sprayer into a conductive coating or conductive sealant that is desirably applied (via the thermal sprayer) to a metal, non-metal, or metal/non-metal interface at, for example, a fastener, or a joint, or to a component edge as an edge seal. The comparative amount of conductive powder that is selected and added to the thermoplastic powder to form the conductive thermoplastic powder mixture, is selected to achieve a particular conductive effect in the eventual conductive thermoplastic coating and/or conductive thermoplastic sealant that is deposited onto a substrate in the form of a conductive coating or conductive sealant. That is, by tailoring the amount of conductive powder added to form the thermoplastic powder mixture used as the thermal sprayer feedstock material, the resulting material exiting the thermal sprayer and deposited onto a substrate surface will become a coating or sealant having a particularly preselected resistivity on the substrate surface.

The tailorable conductive thermoplastic coatings and sealants that are obtained according to aspects of the present disclosure provide conductive flexibility with respect to dissipating static charges that build up with and along a particular material, or are caused by significant electrical events including, for example, lightning strikes. In addition, the conductive thermoplastic coatings, sealants and seals disclosed herein have significant advantages commensurate with thermoplastic materials in terms of ease of handling, ease of application, retention and adhesion characteristics, safety due to lower toxicity (e.g., as compared with certain polysulfides and chromates, etc.), etc.

Still further, since the presently disclosed conductive and non-conductive coatings and sealants are thermoplastic in nature, the disclosed thermoplastic coatings and sealants do not require a separate curing step after application. In other words, the thermoplastic coatings/sealants will "set" upon cooling and require no subsequent curing protocol or regimen to "set up" to form, for example, thermoplastic seals such as thermoplastic edge seals and thermoplastic fillet seals. The disclosed conductive and non-conductive thermoplastic polymer coatings, sealants and seals can be fabricated to further comprise a particular color to, for example, facilitate inspection with respect to both initial application quality as well as repair and maintenance inspections that will be conducted at various quality control and servicing intervals. Still further, if repair or replacement of a thermoplastic polymer coated or sealed part or surface (or a conductive thermoplastic polymer coated or sealed part or surface) is required, such coated or sealed parts or the coatings or seals on such coated/sealed parts can be more easily removed using various solvent or mechanical removal (as compared to, for example, epoxy- or acrylamide-based coatings and/or sealants that require curing regimens, and are more difficult to remove and/or repair, etc.).

With respect to adhesion, the conductive coatings, sealants and seals of the present disclosure have adhesion values ranging from about 5 lbs/in wide area to about 50 lbs/in wide area on both metals and non-metals when performing adhesion testing set forth in ASTM D6862-11(2016) Standard Test Method for 90° Peel Resistance.

In this way, the thermoplastic coating and sealant systems disclosed herein combine the benefits of thermoplastic material characteristics with high-velocity spray techniques and systems (e.g., thermal flame spraying and cold spraying), and the deposited thermoplastic coating and sealant characteristics are further tailorable to a desired end use as coatings, sealants and seals on a substrate surface.

When a conductive powder feedstock component is added to the thermoplastic polymer powder feedstock, the conductive thermoplastic coatings and sealants deposited to a substrate surface have electrical characteristics (e.g., conductivity, resistivity, etc.) that can also be tailored as required for their intended use as conductive coatings and/or sealants, particularly as coatings and/or sealants on homogeneous or hybrid surfaces that include, for example, metallic and/or non-metallic surfaces.

According to a further aspect, the presently known thermal, flame and cold spray equipment and systems can be retrofitted to deposit coatings and sealants made from the presently disclosed thermoplastic polymer powder formulations that can also include conductive powder materials to form conductive thermoplastic polymer coatings and sealants. Particularly preferred thermal sprayers include flame sprayers.

Thermal spraying techniques are coating processes where melted or heated materials are sprayed onto (e.g., deposited onto) a surface. Feedstock material is supplied to the sprayer as a coating precursor. The feedstock is heated by electrical (e.g., plasma or arc) or chemical means (e.g., combustion flame). Thermal spraying can achieve coatings having a coating thickness ranging from about 20 µm to about 5.0 mm over a large area and at a high deposition rate as compared to other known coating processes, with the presently contemplated deposition rate ranging, for example, from about 20 µm on 1 ft$^2$ in 10 seconds, or greater, etc., or coatings deposited at a rate ranging from about 1 to about 50 grams/second (g/s), etc.

Flame spray coating refers to a type of thermal spraying where melted or heated feedstock materials are sprayed onto a substrate surface. The feedstock (e.g., the coating precursor material) is heated by electrical (e.g., plasma or arc) or chemical (e.g., combustion flame) means. During coating processes, the substrate preferably undergoes no distortion, as the substrate temperature remains below about 250° F. during the spray operation. When the substrate is metallic, the substrate is not metallurgically altered. Coating thickness ranging from about 2 µm to 5.0 mm can be achieved, with deposition (e.g., coating application) rates for such thicknesses ranging from at least about 20 µm on 1 ft$^2$ in 10 seconds, or greater, etc., or coatings deposited at a rate ranging from about 1 to about 50 grams/second (g/s), etc.

Without limitation, thermal (e.g., flame, etc.) sprayers useful according to present aspects include, for example, TAFA Models 5220 HP/HVOF®, 8200 HP/HVOF®, 825 JPid HP/HVOF® (ID), 7780 (UPCC), JP-8000 HP/HVOF®, JP-5000® HP/HVOF® (Praxair, Inc., Danbury, Conn.); Powderjet® 86, Powderjet® 85 (Metallizing Equipment Co. Pvt. LTD. (Jodhpur, India) Plasma Technology Inc., Torrence, Calif.): and systems available from Plasma Technology Inc. (Torrence Calif.), etc. Universal Flame Spray System PG-550 (Alamo Supply Co., Ltd., (Houston, Tex.), etc. Various controllers can be used in conjunction with the TAFA systems described including, for example, TAFA Model 7700GF HVOF System (Praxair, Inc., Danbury, Conn.).

In contrast with the flame sprayer systems mentioned above, in "cold spray" systems powder particles (e.g., feedstock particles) typically having an average particle size ranging from about 10 µm to about 40 µm, and are accelerated to very high velocities (200 to 1200 m/s) by a supersonic compressed gas jet at temperatures below their melting point. Upon impact with the substrate, the particles experience extreme and rapid plastic deformation that disrupts the thin surface oxide films that are present on all metals and alloys. This allows intimate conformal contact between the exposed substrate surfaces under high local pressure, permitting bonding to occur with the layers of deposited material. The layers of deposited material can be built up rapidly, with very high deposition efficiency (e.g., above 90% in some cases). Using cold spray systems, materials can be deposited without high thermal loads, producing coatings with low porosity and oxygen content. Without limitation, cold sprayers useful according to present aspects include, for example, Impact Spray System 5/8; Impact Spray System 5/11 (Impact Innovations Waldkraiburg, Germany), etc.

Cold spray processes further refer to the thermal spray processes collectively referred to as cold gas dynamic spraying, kinetic spraying, high velocity particle consolidation (HPVC), high-velocity powder deposition, supersonic particle/powder deposition (SPD), and the like. In such cold spraying systems, a high velocity gas jet, for example, a deLaval converging/diverging nozzle can be used to accelerate powder particles generally having an average particle size ranging from about 1 µm to about 50 µm. The particles are accelerated by the gas jet at a temperature that is below the melting point of the feedstock material particles. The particles are then sprayed onto a substrate that can be located about 25 mm from the nozzle. The particles impact the substrate and form a coating. Without being bound by a particular theory, it is believed that the kinetic energy of the particles, rather than an elevated temperature causes the particles to plastically deform on impact with the substrate surface to form "splats" that bond together to produce the coating. The coatings formed from the cold sprayed particles are formed in the solid state, and not via the melting followed by solidification as occurs in thermal spray processes (e.g., flame spraying, etc.) using elevated temperature. Such a cold spray process avoids deleterious effects that can be caused by high temperature deposition, including, for example, high-temperature oxidation, evaporation, melting, crystallization, residual stress, gas release, etc. As a result, according to present aspects, cold spraying can be advantageously used for temperature sensitive (e.g., heat sensitive) substrates. The resulting coatings according to preset aspects, possess characteristics including high strength, low porosity and minimal residual stress.

As mentioned above, characteristics of the thermoplastic polymer coatings contemplated according to present aspects can be altered, tailored or "tuned" in a predetermined fashion by providing a predetermined combination of materials to form a tailored thermoplastic polymer powder feedstock material, and by further incorporating additives, including, without limitation, additives such as pigments, dyes, or coloring agents, etc. Such coloring agents can facilitate the inspection of the condition of coatings during, for example, inspections, etc.

As mentioned previously, the high-velocity sprayers used in the systems and methods disclosed herein can be operated manually, but can also be automated by incorporating or otherwise attaching the sprayer to a robot, (equivalently referred to herein as a "robotic arm" or "robotic structure") that includes or is in communication with sensors, controllers, software and hardware, etc. for the purpose of controlling the operation and movement of the sprayer and controlling the operation of the sprayer (e.g., controlling the amount of material dispensed from a sprayer, the amount of material deposited onto a substrate or substrates, and the location of the deposited material on a substrate or substrates) during, for example a material deposition (e.g., coating, sealing etc.) cycle. The robot and equipment associated with the robot and sprayer can be operated and powered directly, and further can be operated remotely, including in response to, for example, wireless signals, etc.

Certain coatings and sealants that require a particular robustness in terms of adhesion and/or resistance to environmental factors such as those encountered, for example, in vehicle fuel tanks, etc., previously have been classified with various toxicities, making their handling and application hazardous to personnel. In addition, various application sites have been difficult to access. In addition, maintaining and/or replacing the coatings and sealants presently in use has resulted in significant repair and replacement time, for the removal of cured coatings and sealants. In contrast, the coatings, sealants and seals made possible according to aspects of the present disclosure, being thermoplastic materials, have significantly reduced toxicity during application, and can be more easily inspected, removed and replaced (e.g., at scheduled routine inspection and/or replacement).

In addition, the presently disclosed coatings made from the disclosed thermoplastic polymer powder formulations maintain adhesion characteristics over a required service period that is at least equivalent to or exceeds that, which is achievable using previously available coatings and sealants (e.g., epoxy and acrylamide based options, etc.). The adhesion of the thermoplastic polymer coatings, sealants, and seals made from the disclosed thermoplastic polymer powder formulations have an adhesion value ranging from about 5 to about 50 lbs./in$^2$ wide area when performing adhesion testing set forth in ASTM D6862-11(2016) Standard Test Method for 90° Peel Resistance. The ability to tailor the composition of the presently disclosed thermoplastic polymer sealants and seals facilitates producing a thermoplastic polymer sealant and thermoplastic polymer seal having desired and predetermined physical characteristics including, for example thermoplastic polymer sealants and thermoplastic polymer seals having a Young's modulus ranging from about 1 MPa to about 4 GPa.

When a conductive seal is desired, the contemplated thermoplastic polymer coatings, sealants, films, etc., can be tailored to achieve a desired surface resistivity, for example, ranging from about $1\times10^5$ to about $1\times10^{11}$ ohm-m, and more preferably ranging from about $1\times10^5$ to about $1\times10^8$ ohm-m, when the conductive component composition of the thermoplastic polymer powder feedstock ranges from about 1% to about 9% by volume of the total volume of the conductive thermoplastic polymer powder feedstock. The desired characteristics of the coatings, sealants and seals produced, including, for example, the desired resistivity, setting time, thickness, etc., determines the concentration of the conductive powder feedstock component that is incorporated into the thermoplastic polymer powder feedstock, or that is supplied to the high-velocity sprayer substantially concurrently with the thermoplastic polymer powder feedstock (e.g., in the situation where feedstocks are supplied to the sprayer separately and a feedstock mixture is not prepared and then delivered to the sprayer).

As stated previously, epoxy-based and acrylamide-based coatings and sealants have been used in various assemblies and sub-assemblies that are found, for example, in vehicles including aircraft, as well as structural components used in the manufacture of fuel tanks on such vehicles. However, such coatings not only present toxicity issues to handlers and workers, but such material have required significant curing times; in excess of many days. Further, long curing times delay manufacturing and increase manufacturing cost.

In contrast to epoxy-based and other materials requiring curing time of several days or longer, the presently disclosed thermoplastic polymer coatings and sealants applied according to the presently disclosed methods do not require curing, and only require the time necessary for the thermoplastic material to cool and "set" (e.g. thermoplastic material "set" times understood to range from about less than a few mins. to about several mins., or the amount of time a thermoplastic material takes to cool from an applied temperature to about room (ambient) temperature, assuming coating thicknesses ranging from about 2.5 mm to about 5.0 mm). According to present aspects, such "set" times for the deposited thermoplastic polymer coatings and sealants disclosed herein (including the deposited conductive thermoplastic polymer coatings and sealants) are in strong contrast to the curing times of several days that are required to cure sealants and coatings previously used for the purposes intended herein on the substrates and substrate surfaces intended and disclosed herein, including the spatially restrictive and other difficult-to-access areas, assemblies and sub-assemblies (e.g., vehicle fuel tanks, including aircraft fuel tanks, etc.).

The characteristics of the presently disclosed thermoplastic polymers are particularly desirable for use as coatings and sealants (in coating and sealing processes) for substrates in hard to access locations in assemblies and sub-assemblies. Such substrates, include substrates requiring or otherwise benefitting from the use of thermoplastic polymer coatings and sealants having a predetermined and tailorable conductivity (or resistivity, etc.), or assembly locations where it had not been previously possible to deposit a coating or sealant having variable or tailored conductive or other characteristics. According to aspects of the present disclosure, the fabrication and use of electrically variable conductive coatings and sealants that can also have multiple physical and chemical characteristics tailored, and that are made from presently disclosed thermoplastic polymer powder formulations, and applied according to presently disclosed methods, has now been achieved.

FIG. 1 shows a block diagram outlining an aspect showing a thermoplastic polymer powder feedstock and a system 10 including directing the thermoplastic polymer powder feedstock to a high-velocity sprayer for depositing a thermoplastic polymer coating onto a substrate surface. As shown in FIG. 1, a thermoplastic polymer powder feedstock 12 is directed from a thermoplastic polymer powder feedstock supply via a feedline 11 in communication with the thermoplastic polymer powder feedstock 12 and also in communication with a high-velocity sprayer 14. Predetermined amounts of the thermoplastic polymer powder feedstock 12 can be directed by any desirable means that will direct the thermoplastic polymer powder feedstock 12 to the high-velocity sprayer 14, including automated means regulated by a controller (not shown) and subject to, for example, software and hardware known to control, for example, feedstock flow rates, etc. The high-velocity sprayer can be a thermal sprayer or a cold sprayer. As shown in FIG. 1, the thermoplastic polymer powder feedstock 12 is converted by the high-velocity sprayer 14 into a thermoplastic polymer coating 16a onto substrate 16. While the high-velocity sprayer 14 can be operated manually, FIG. 1 shows an optional robotic arm 13 (or "robot") that can be in communication with a controller 15. Controller 15 can further optionally be in communication with remote or integrated software or hardware, as desired, to control robotic arm movement as well as control flow rates and amounts of material deposited as a thermoplastic coating 16a onto a substrate 16. Optionally, additional controllers (not shown) can be integrated into system 10 to control one or more aspects of system 10.

FIG. 2A shows a block diagram outlining an aspect showing a thermoplastic polymer powder feedstock mixture and system 20 including mixing multiple thermoplastic polymer powder feedstocks to form a thermoplastic powder mixture, and then directing an amount of the thermoplastic powder mixture to a high-velocity sprayer and depositing a thermoplastic polymer coating onto a substrate surface. As shown in FIG. 2A, in system 20, predetermined amounts of a first thermoplastic polymer feedstock 22a, and a second thermoplastic polymer feedstock 22b are directed to a mixing vessel (not shown). The predetermined amounts of the first and second thermoplastic polymer feedstocks 22a, 22b are delivered via first and second thermoplastic polymer powder feedstock feedlines 21a and 21b, respectively, and mixed together to form a thermoplastic polymer powder feedstock mixture 27. The thermoplastic polymer powder feedstock mixture 27 is directed via feedstock mixture feedline 28 to high-velocity sprayer 24. Feedstock mixture Feedline 28, as shown in FIG. 2A, is in communication with thermoplastic polymer powder feedstock mixture 27 and the high-velocity sprayer 24. Predetermined amounts of the first thermoplastic powder feedstock 22a and the second thermoplastic polymer powder feedstock 22b can be directed from respective feedstock supplies (not shown) by any desirable means, including automated means regulated by a controller (not shown) and subject to, for example, software and hardware known to control, for example, feedstock flow rates from a supply to a sprayer, etc. The high-velocity sprayer 24 can be a thermal sprayer or a cold sprayer. As shown in FIG. 2A, the thermoplastic polymer powder feedstock mixture 27 is converted by the high-velocity sprayer 24 into a thermoplastic polymer coating 26a deposited onto substrate 26. While the high-velocity sprayer 24 can be operated manually, FIG. 2A shows an optional robotic arm 23 (or "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 20 to control one or more aspects of system 20.

FIG. 2B shows a block diagram outlining an aspect showing two thermoplastic polymer powder feedstocks and system 30 similar to system 20 shown in FIG. 2A, except that, as shown in FIG. 2B, system 30 comprises first and second thermoplastic polymer powder feedstock feedlines 31a and 31b in communication with the high-velocity sprayer 24 and the first and second thermoplastic polymer powder feedstocks 22a and 22b, respectively. That is, as shown in FIG. 2B, amounts of the first and second thermoplastic polymer powder feedstocks 22a, 22b are not mixed together to form a feedstock mixture. Instead, according to the aspect shown in FIG. 2B as system 30, a predetermined amount of the first thermoplastic polymer powder feedstock 22a is directed to high-velocity sprayer 24 via first thermoplastic polymer powder feedstock feedline 31a. Similarly, a predetermined amount of the second thermoplastic polymer powder feedstock 22b is directed to the high-velocity sprayer 24 via second thermoplastic polymer powder feedstock feedline 31b. While the high-velocity sprayer 24 can be operated manually, FIG. 2B shows an optional robotic arm 23 (or "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 30 to control one or more aspects of system 30.

FIG. 3A shows a block diagram outlining an aspect showing a thermoplastic polymer powder feedstock and a conductive powder feedstock and a system 40. As shown in FIG. 3A, in system 40, a thermoplastic polymer powder feedstock 42a, and a conductive powder feedstock 42b are directed to a mixing vessel (not shown). The predetermined amounts of the first and second thermoplastic polymer feedstocks 42a, 42b are delivered via first and second thermoplastic polymer powder feedstock feedlines 41a and 41b, respectively, and mixed together to form a conductive thermoplastic polymer powder feedstock mixture 47. An amount of the conductive thermoplastic polymer powder feedstock mixture 47 is directed via conductive thermoplastic polymer powder feedstock mixture feedline 48 to high-velocity sprayer 44. Feedline 48 as shown in FIG. 3A is in communication with conductive thermoplastic feedstock mixture 47 and the high-velocity sprayer 44. Predetermined amounts of conductive thermoplastic polymer feedstock mixture 47 can be directed to the high-velocity sprayer 44 by any desirable means, including automated means regulated by a controller (not shown) and subject to, for example, software and hardware known to control, for example, feedstock flow rates from a supply to a sprayer, etc. The high-velocity sprayer 44 can be a thermal sprayer or a cold sprayer. As shown in FIG. 3A, the conductive thermoplastic polymer powder feedstock is converted by the high-velocity sprayer 44 into a conductive thermoplastic polymer coating 46a deposited onto substrate 46. While the high-velocity sprayer 44 can be operated manually, FIG. 3A shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 40 to control one or more aspects of system 40.

FIG. 3B shows a block diagram outlining an aspect showing a conductive thermoplastic polymer powder and a system 50 similar to system 40 shown in FIG. 3A, except that as shown in FIG. 3B, system 50 comprises a thermoplastic polymer powder feedstock feedline 51a in communication with a thermoplastic polymer powder feedstock 42a and a high-velocity sprayer 44. Conductive powder feedstock feedline 51b is shown in communication with the conductive powder feedstock 42b and the high-velocity sprayer 44. That is, as shown in FIG. 3B, an amount of the thermoplastic polymer powder feedstock 42a is not mixed with an amount of the conductive powder feedstock 42b to form a conductive thermoplastic polymer feedstock mixture. Instead, according to an aspect shown in FIG. 3B as system 50, a predetermined amount of the thermoplastic polymer powder feedstock 42a is directed to high-velocity sprayer 44 via thermoplastic polymer powder feedstock feedline 51a. Similarly, a predetermined amount of the conductive powder feedstock 42b is directed to the high-velocity sprayer 24 via conductive powder feedstock feedline 51b. While the high-velocity sprayer 44 can be operated manually, FIG. 3B shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 50 to control one or more aspects of system 50.

FIG. 4A shows a block diagram outlining an aspect showing a conductive thermoplastic polymer powder feedstock and a system 60 including mixing first and second thermoplastic polymer powder feedstocks with a conductive powder feedstock to form a conductive thermoplastic powder feedstock mixture, and then directing an amount of the conductive thermoplastic powder feedstock mixture to a high-velocity sprayer and depositing a conductive thermoplastic polymer coating onto a substrate surface. As shown in FIG. 4A, in system 60, an amount of a first thermoplastic polymer powder feedstock 62*a*, an amount of a second thermoplastic polymer powder feedstock 62*b*, and an amount of a conductive powder feedstock 62*c* are directed to a mixing vessel (not shown) and are mixed together to form a conductive thermoplastic polymer powder feedstock mixture 67. A desired amount of the conductive thermoplastic polymer powder feedstock mixture 67 is directed via feedstock mixture feedline 68 to high-velocity sprayer 64. Feedstock mixture feedline 68, as shown in FIG. 4A, is in communication with conductive thermoplastic polymer powder feedstock mixture 67 and the high-velocity sprayer 64. Predetermined amounts of: 1) the first thermoplastic polymer powder feedstock 62*a*; 2) the second thermoplastic polymer powder feedstock 62*b*; and 3) the conductive powder feedstock 62*c* are directed to the conductive thermoplastic polymer powder feedstock mixture 67 via first thermoplastic polymer powder feedstock feedline 61*a*, second thermoplastic polymer powder feedstock feedline 61*b* and conductive polymer powder feedstock feedline 61*c*, respectively, by any desirable means. Predetermined amounts of conductive thermoplastic polymer feedstock mixture 67 are directed to the high-velocity sprayer 64 by any desirable means, including, for example, an automated means regulated by a controller (not shown) and subject to, for example, software and hardware known to control, for example, feedstock flow rates to a sprayer, etc. The high-velocity sprayer 64 can be a thermal sprayer or a cold sprayer. As shown in FIG. 4A, the conductive thermoplastic polymer powder feedstock mixture 67 is converted by the high-velocity sprayer 44 into a conductive thermoplastic polymer coating 66*a* deposited onto substrate 46. While the high-velocity sprayer 64 can be operated manually, FIG. 4A shows an optional robotic arm 63 (or "robot") that can be in communication with a controller 65. Controller 65 can further optionally be in communication with remote or integrated software or hardware, as desired, to control movement of the robotic arm 63 as well as control flow rates and amounts of deposited conductive thermoplastic polymer coating 66*a* onto a substrate 66. Optionally, additional controllers (not shown) can be integrated into system 60 to control one or more aspects of system 60.

FIG. 4B shows a block diagram outlining an aspect showing a conductive thermoplastic polymer powder and a system 70 similar to system 60 shown in FIG. 4A, except that as shown in FIG. 4B, system 70 comprises: 1) a first thermoplastic polymer powder feedstock feedline 71*a* in communication with the first thermoplastic polymer powder feedstock 62*a* and the high-velocity sprayer 64; 2) a second thermoplastic polymer powder feedstock feedline 71*b* in communication with the first thermoplastic polymer powder feedstock 62*b* and the high-velocity sprayer 64; and 3) a conductive powder feedstock feedline 71*c* in communication with the conductive powder feedstock 62*c* and the high-velocity sprayer 64. That is, as shown in FIG. 4B, an amount of the first thermoplastic polymer powder feedstock 62*a*, and an amount of the second thermoplastic polymer powder feedstock 62*b* are not mixed with an amount of the conductive powder feedstock to form a conductive thermoplastic polymer feedstock mixture. Instead, according to system 70 shown in FIG. 4B, a predetermined amount of the first thermoplastic polymer powder feedstock 62*a* is directed to high-velocity sprayer 64 via first thermoplastic polymer powder feedstock feedline 71*a*. Similarly, a predetermined amount of the second thermoplastic polymer powder feedstock 62*b* is directed to high-velocity sprayer 64 via second thermoplastic polymer powder feedstock feedline 71*b*. Further, a predetermined amount of the conductive powder feedstock 62*c* is directed to the high-velocity sprayer 64 via conductive powder feedstock feedline 71*c*. While the high-velocity sprayer 64 can be operated manually, FIG. 4B shows an optional robotic arm 63 that can be in communication with a controller 65. Controller 65 can further optionally be in communication with remote or integrated software or hardware, as desired, to control movement of a robotic arm 63 (or "robot") as well as control flow rates and amounts of deposited conductive thermoplastic polymer coating 66*a* onto a substrate 66. Optionally, additional controllers (not shown) can be integrated into system 70 to control one or more aspects of system 70.

The robotic arm disclosed above is equivalently referred to herein as a "robot", such that any feature of the robot (in addition to the "arm") can control the relative movement of the high-velocity sprayer, and/or the robot can control the direction of spray emitted from the high-velocity sprayer (e.g., the robot controls the direction and change the direction of spray from the high-velocity sprayer while the sprayer itself remains in a substantially stationary position, etc.).

FIG. 5 is an illustration of an aircraft 80 having substrate surfaces and assemblies, sub-assemblies and components having substrate surfaces that can be advantageously coated by the thermoplastic polymer coatings and/or the conductive thermoplastic coatings set forth herein. It is further understood that, the coatings described herein can be advantageously coated onto substrates occurring on components, assemblies and sub-assemblies incorporated in further types of manned and unmanned aircraft, terrestrial vehicles, subsurface and surface marine (e.g., water borne) vehicles, manned and unmanned satellites, etc.

FIGS. 6-8 are flowcharts outlining aspects of the present disclosure. FIG. 6 outlines a method 100 comprising directing 102 at least one thermoplastic polymer powder to a high-velocity sprayer, followed by forming 104 a thermoplastic polymer spray formulation at or near the high-velocity sprayer. The method outlined in FIG. 6 further comprises directing 106 the thermoplastic spray formulation from the high-velocity sprayer to a substrate having a substrate surface, and forming 108 a thermoplastic polymer coating on the substrate surface. The method outlined in FIG. 6 is understood to at least relate to the systems shown in FIGS. 1, 2A and 2B.

FIG. 7 outlines a method 100 comprising directing 102 an amount of at least one thermoplastic polymer powder to a high-velocity sprayer, followed by directing 103 an amount of conductive powder to the high-velocity sprayer concurrently with thermoplastic polymer powder and forming 104*a* a conductive thermoplastic polymer spray formulation at or near the high velocity sprayer. The method further comprises directing 106*a* the conductive thermoplastic polymer spray formulation from the sprayer to a substrate surface, and forming 108*a* a conductive thermoplastic coating on the substrate surface. The method outlined in FIG. 7 is understood to at least relate to the systems shown in FIGS. 3A, 3B, 4A and 4B.

FIG. 8 outlines a method 120 comprising directing 102*a* an amount of a first thermoplastic polymer powder and an amount of a second thermoplastic polymer powder and an amount of a conductive powder to a high-velocity sprayer, followed by forming 104*a* a conductive thermoplastic polymer spray formulation. The method further comprises directing 106*a* the conductive thermoplastic polymer formulation from the sprayer to a substrate surface, and forming 108*a* a conductive thermoplastic coating on the substrate surface. The method outlined in FIG. 8 is understood to at least relate to the systems shown in FIGS. 4A and 4B.

FIG. 9 is an illustration of a first substrate and a second substrate, (equivalently referred to herein as first and second components or first and second parts) that are fastened together and, when sealed, a fillet seal is formed at the interface of the first substrate and second substrate (interface referred to equivalently herein as "juncture"). Fillet seals are understood to occur two interfacing substrates (e.g., at the interface at or between to proximately located substrate surfaces, panels, etc.) The sealant applied to the area of the fillet seal effectively seals any gap or space at the interface.

Further, when the first and second substrates include exposed edges edge seals may be required to ameliorate an undesirable phenomenon known as "edge glow", when substrate material at edges of the substrate are exposed. Fiber-based materials (e.g., for example, composite based materials that incorporate carbon fibers, boron fibers, aramid fibers, etc.), can be particularly susceptible to "edge glow" as the exposed fiber ends at a component edge can behave as a cathode that emits electrons to a degree that can approximate the electrical energy of a weak spark.

As shown in FIG. 9 and according to present aspects, the edges of such materials are sealed by the presently disclosed sealants to form protective edge seals at the edges of the first and second substrates. Additionally, filled seals are shown applied to the interface of two substrates or components. As shown in FIG. 9, an assembly 130 comprises a first substrate 132 and a second substrate 134 that are joined (e.g., fastened together via fasteners 136). As shown in FIG. 9, the first 132 and second 134 substrates are joined in an overlapping orientation to form a lap joint. A thermoplastic polymer sealant 137 (that can also comprise an amount of conductive material for the purpose of delivering a predetermined resistivity to the thermoplastic polymer coating) is applied to the first 132 and second 134 substrates, such that a fillet seal 138 is formed at the first substrate 132 and second substrate 134 interface 139. As further shown in FIG. 9, first substrate edge 132a, and a portion of second substrate edge 134a are also coated with the thermoplastic polymer coating 137 (that can also comprise a predetermined amount of conductive material for the purpose of delivering a predetermined and tailored resistivity value to the thermoplastic polymer coating) to form a first substrate edge seal 132b and a second substrate edge seal 134b.

FIGS. 10 and 11 are illustrations of a portion of an aircraft fuel tank interior 140 showing a first substrate 142 oriented proximate to a second substrate 144. As shown in FIGS. 10 and 11, the first substrate 142 is fastened to the second substrate 144 via fasteners 146. A thermoplastic polymer sealant 147 (that can also comprise a predetermined amount of conductive material for the purpose of delivering a predetermined and tailored resistivity value to the thermoplastic polymer coating) is applied to the first 142 and second 144 substrates, such that a fillet seal 148 is formed at the substrate interface 149 located at the juncture of the first substrate 142 and second substrate 144. Though not shown in FIGS. 10 and 11, it is understood that, depending on the composition of the first and second substrates (142, 144), the sealant material 147 could obtain an edge seal at the exposed edge of the first and/or second substrates 142, 144. That is, if either of the first and/or second substrates 142, 144 comprise a fiber-based or other material that could be susceptible to "edge glow" in the presence of a charge (e.g., an electrical charge caused by or resulting from an EME, etc.), the thermoplastic polymer sealant 147 can be applied to achieve the required edge seals at the edges of first and or second substrates 142, 144.

FIG. 12 is an illustration of n aircraft fuel tank interior 150 showing a first substrate 152 oriented proximate to a second substrate 154. As shown in FIG. 12, the first substrate 152 is fastened to the second substrate 154 via fasteners 156. A thermoplastic polymer sealant 157 (that can also comprise a predetermined amount of conductive material for the purpose of delivering a predetermined and tailored resistivity value to the thermoplastic polymer coating) is applied to the first 152 and second 154 substrates, such that a fillet seal 158 is formed at the substrate interface 159 located at the juncture of the first substrate 152 and second substrate 154. Though not specifically shown in FIG. 12, it is understood that, depending on the composition of the first and second substrates (152, 154), the sealant material 157 could obtain an edge seal at the exposed edge of the first and/or second substrates 152, 154. That is, if either of the first and/or second substrates 152, 154 comprise a fiber-based or other material that could be susceptible to "edge glow" in the presence of a charge (e.g., an electrical charge caused by or resulting from an EME, etc.), the thermoplastic polymer sealant 157 can be applied to achieve the required edge seals at the edges of first and or second substrates 152, 154.

According to aspects of the present disclosure, and as shown in FIGS. 9, 10, 11, and 12, when first substrate materials are made from a material having a resistivity value that differs from the resistivity value of the second substrate, and where the two substrates are joined together, or are otherwise in close proximal contact, the variance in resistivities can result in damage at such junctures when EMEs occur (e.g., resulting from static discharge and/or lightning strikes), or at the substrate edges. The conductive thermoplastic polymer sealant materials (e.g. equivalently referred to herein as the "sealants") and seals placed as fillet seals between such first and second structures and/or as end seals on such structures, as well as seals placed as edge seals at first and/or second substrate edges ameliorate or eliminate deleterious effects and damage otherwise caused by EMEs.

Still further, the seals and sealants disclosed herein afford many advantages over non-thermoplastic sealants presently used in the manufacture of sub-assemblies and assemblies that house or otherwise become exposed to harsh environmental factors and the presence of chemicals, solvents, fuels, etc. (e.g., fuel tank, etc.). In other words, even when substrate materials have similar resistivities to one another and can allow static or other electrical charges to pass freely and without incident from structure to structure, the thermoplastic seals and thermoplastic sealant materials disclosed herein that do not have a conductive component still allow for improved sealing processes and improved seals and sealants as compared to known sealants and sealant materials used, for example, in the manufacture of enclosed environments, including, without limitation, assemblies such as fuel tanks, and aircraft fuel tanks., etc.

According to aspects of the present disclosure, when at least one of a first and second substrate to be joined together (or that are oriented relative to one another to form a seal requirement at the juncture of the substrates, or a seal requirement at the edges or one or more substrates) are made from materials having differing electrical resistivities (or electrical conductivities), a thermoplastic polymer powder feedstock is "doped" with a predetermined amount of conductive powder to form a conductive thermoplastic polymer powder feedstock. As the conductive thermoplastic powder feedstock proceeds into and through the sprayer, the powder comprising particles is subjected to heat and/or high velocity via gas jets to at least soften and deform the particles in the conductive thermoplastic polymer powder feedstock. The particles leave the sprayer as a particulate spray at a predetermined velocity and impact a desired target such as, for example, the areas where fillet seals and edge seals on a substrate or substrates are required. Upon impact on the selected target(s) (e.g., substrate surfaces, etc.), the particulate spray forms a thermoplastic polymer coating, or thermoplastic polymer sealant, on the substrates and forms a thermoplastic polymer seal.

The resistivity value of the thermoplastic polymer seals formed by the presently disclosed sealants formed can be tailored or "tuned" to a desired resistivity value. In this way, if the coated substrate materials are subjected to an electromagnetic effect (EME), such as, for example, from the electrical discharge of static electricity, or from a lightning strike, etc., the conductivity of the thermoplastic polymer sealant and seals will at least ameliorate deleterious effects from the EME that would otherwise be encountered at or near the fillet seals occurring at or near the substrate interfaces (e.g., adjoined structures), and at substrate material edge seals.

FIG. 13 is a flowchart outlining a method according to aspects of the present disclosure, with the method 200 including, delivering 202 at least one thermoplastic polymer powder feedstock to a high-velocity sprayer. The thermoplastic polymer powder feedstock includes at least one of polyetheretherketone, polyetherketoneketone, polyamide, polyphenylsulfide, polyphenylsulfone, polysulfone, and polyetheramide. The thermoplastic polymer powder feedstock can include at least one of copolymers including Hytrel® TPC-ET (DuPont®), thermoplastic elastomers, and thermoplastic fluoroelastomers including DAI-EL® T-530 (Daikin®). The disclosed method further includes forming 204 a thermoplastic polymer sealant material and directing 206 the thermoplastic polymer sealant material from the high-velocity sprayer to a substrate surface, and depositing 208 an amount of the thermoplastic polymer sealant material onto the substrate to form a thermoplastic polymer seal. The method outlined in FIG. 13 can be used to form the thermoplastic polymer material sealant and the resulting seals formed therefrom as shown in any one or more of FIG. 1 through FIG. 12.

FIG. 14 is a flowchart outlining a further method according to aspects of the present disclosure, with the method 300 including, delivering 202 at least one thermoplastic polymer powder feedstock to a high-velocity sprayer. The thermoplastic polymer powder feedstock includes at least one of polyetheretherketone, polyetherketoneketone, polyamide, polyphenylsulfide, polyphenylsulfone, polysulfone, and polyetheramide. The thermoplastic polymer powder feedstock can include at least one of copolymers including Hytrel® TPC-ET (DuPont®), thermoplastic elastomers, and thermoplastic fluoroelastomers including DAI-EL® T-530 (Daikin®). The disclosed method further includes forming 204 a thermoplastic polymer sealant material and directing 206 the thermoplastic polymer sealant material from the high-velocity sprayer to a substrate surface, and depositing 208 an amount of the thermoplastic polymer sealant onto the substrate to form a thermoplastic polymer seal. The method 300 further includes directing 210 movement of the high-velocity sprayer with the movement directed by a robot, equivalently referred to herein as a "robot arm" or "robotic structure". The robot is in communication with the high-velocity sprayer and the robot is further in communication with a controller. The method outlined in FIG. 14 can be used to form the thermoplastic polymer material, sealants and the resulting seals formed therefrom as disclosed in any one or more of FIG. 1 through FIG. 13.

FIG. 15 is a flowchart outlining a methods according to aspects of the present disclosure, with the method 400 including, delivering 402 at least one thermoplastic polymer powder feedstock to a high-velocity sprayer. The thermoplastic polymer powder feedstock includes at least one of polyetheretherketone, polyetherketoneketone, polyamide, polyphenylsulfide, polyphenylsulfone, polysulfone, and polyetheramide. The thermoplastic polymer powder feedstock can include at least one of copolymers including Hytrel® TPC-ET (DuPont®), thermoplastic elastomers, and thermoplastic fluoroelastomers including DAI-EL® T-530 (Daikin®). The disclosed method further includes delivering 404 a conductive powder feedstock to the high-velocity sprayer, forming 406 a thermoplastic polymer sealant material and directing 408 the thermoplastic polymer sealant material from the high-velocity sprayer to a substrate surface, and depositing 410 an amount of the thermoplastic polymer sealant onto the substrate to form a thermoplastic polymer seal. The method outlined in FIG. 15 can be used to form the thermoplastic polymer material and sealants and the seals formed therefrom as shown in any one or more of FIG. 1 through FIG. 14.

FIG. 16 is a flowchart outlining a methods according to aspects of the present disclosure, with the method 400 including, delivering 402 at least one thermoplastic polymer powder feedstock to a high-velocity sprayer. The thermoplastic polymer powder feedstock includes at least one of polyetheretherketone, polyetherketoneketone, polyamide, polyphenylsulfide, polyphenylsulfone, polysulfone, and polyetheramide. The thermoplastic polymer powder feedstock can include at least one of copolymers including Hytrel® TPC-ET (DuPont®), thermoplastic elastomers, and thermoplastic fluoroelastomers including DAI-EL® T-530 (Daikin®). The disclosed method further includes delivering 404 a conductive powder feedstock to the high-velocity sprayer, forming 206 a thermoplastic polymer sealant material and directing 408 the thermoplastic polymer sealant material from the high-velocity sprayer to a substrate surface, and depositing 410 an amount of the thermoplastic polymer sealant onto the substrate to form a thermoplastic polymer seal. The method 400 further includes directing 412 movement of the high-velocity sprayer with the movement directed by a robot structure in communication with the high-velocity sprayer and with the robot structure further in communication with a controller. The method outlined in FIG. 15 can be used to form the thermoplastic polymer material and sealants as shown in any one or more of FIG. 1 through FIG. 14.

EXAMPLE 1

At room temperature, an amount of 95 g of PEEK powder (KetaSpire® KT820, low melt flow; KetaSpire® KT-880, high melt flow—Spire Ultra Polymers, Solvay, Brussels Belgium) having a median particle size of about 30 μm was mixed with an amount of 5 g of conductive titanium powder (TS1374—Titanium Powder—Stanford Advanced Materials, Irvine, Calif.) having a nominal particle diameter of about 90 μm. The two powders were mixed using a Mazerustar Mixer (Medisca, LasVegas, Nev.), to form a thorough conductive thermoplastic polymer powder mixture produced by the combining of the two powders (representing 100% by weight). The mixture was loaded as a feedstock into a reservoir of a thermal sprayer (ASC PG-550 (Alamo Supply Co., Lt., Houston, Tex.) Three formulations having a varied amount (% by volume) of titanium in the total powder mixture were prepared: 1) 1% titanium powder by volume; 2) 6% titanium by volume; and 3) 9% titanium by volume.

EXAMPLE 2

The thermal sprayer was set to a flow rate equal to approximately 1 to 50 g/sec., and amounts of the three feedstock mixtures (conductive thermoplastic polymer powder mixtures) prepared in Example 1 were each directed from the reservoir into the thermal sprayer and to the heated spray head. Each feedstock achieved a phase change, from solid to a flowing, heated sprayable liquid, and was then sprayed as a particulate spray and directed by and from the thermal sprayer to a substrate surface comprising a lap joint interface of an aluminum panel (2000, 6000 and 7000 series aluminum) located proximate to a carbon fiber reinforced plastic composite panel. The substrate surface was solvent cleaned (acetone wipe) and dried completely. The head of the thermal sprayer was located at a distance of about 24" from the substrate surface. The thermal sprayer was moved manually to deposit a visually uniform coverage of the substrate surface. The substrate surface temperature was monitored with a thermostat.

EXAMPLE 3

The conductive thermoplastic coatings prepared and deposited according to the processes described in Examples 1 and 2 were allowed to cool on the substrate surface for not more than 5 minutes. The conductive thermoplastic coating had measured resistivity values as set forth in Table 1 for three Samples (#1, #2, and #3) having 1%, 6% and 9% by volume of titanium in the conductive thermoplastic polymer powder formulations prepared. Adjusting the amount/concentration/ratio of conductive titanium powder in the thermoplastic polymer (PEEK/Ti) powder feedstock mixture resulted in a measured variance in the resistivity of the conductive thermoplastic polymer coating as noted in Table 1.

TABLE 1

| PEEK/Titanium Powder | | |
|---|---|---|
| PEEK Powder (% by total volume of PEEK/Ti Mixture) | Ti Powder (% by total volume of PEEK/Ti Mixture) | Resistivity (ohm-m) |
| 99% | 1% | $1 \times 10e^{10}$ |
| 94% | 6% | $1 \times 10e^{8}$ |
| 91% | 9% | $1 \times 10e^{7}$ |

Additional amounts of thermoplastic polymer powders were mixed with varying amounts of conductive powders to produce feedstock mixtures as described above.

Aspects of the present disclosure contemplate thermoplastic polymer sealants and seals and conductive thermoplastic polymer sealants and seals, and methods of their delivery to substrates and substrate surfaces comprising such sealants and seals), as well as components and assemblies comprising such thermoplastic polymer and conductive thermoplastic polymer sealants and seals, and larger structures and object comprising components and assemblies that comprise the disclosed thermoplastic polymer and conductive thermoplastic polymer sealants and seals, including, for example and without limitation, vehicles, including aircraft. Such contemplated components, assemblies etc. include, without limitation, seals found required for installing, securing, etc. components, assemblies, etc. associated with aircraft (e.g. spars, ribs, stringers, etc.), with such components finding particular utility in connection with vehicle fuel tanks and fuel tank systems. Such vehicles include, without limitation, a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned and unmanned hovercraft, a manned surface water borne vehicle, an unmanned surface water borne vehicle, a manned sub-surface water borne vehicle, an unmanned sub-surface water borne vehicle, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for depositing a tunable thermoplastic polymer sealant material to a substrate surface, the method comprising:
    delivering a first thermoplastic polymer powder feedstock to a high-velocity cold sprayer, said first thermoplastic polymer powder comprising at least one of: nylon, polyetheretherketone, polyetherketoneketone, polyamide, polyphenylsulfide, polyphenylsulfone, polysulfone, and polyetherimide, said thermoplastic polymer powder feedstock having an average particle size ranging from about 20 µm to about 300 µm;
    delivering a second thermoplastic polymer powder feedstock to the high-velocity cold sprayer, said second thermoplastic polymer powder comprising at least one of: nylon, polyetheretherketone, polyetherketoneketone, polyamide, polyphenylsulfide, polyphenylsulfone, polysulfone, and polyetherimide, said thermoplastic polymer powder feedstock having an average particle size ranging from about 20 µm to about 300 µm;
    tailoring the properties of the first thermoplastic polymer;
    forming a tunable thermoplastic polymer powder feedstock;
    directing the tunable thermoplastic polymer powder feedstock from the high-velocity cold sprayer to a substrate surface to form a thermoplastic sealant material;
    forming a tunable thermoplastic polymer sealant material comprising a density ranging from about 1.0 to about 1.8 g/cc;
    depositing an amount of the tunable thermoplastic polymer sealant material onto the substrate surface to form a tunable thermoplastic polymer seal, said tunable thermoplastic polymer seal deposited to an average thickness ranging from about 10 µm to about 2000 µm; and
    wherein said first thermoplastic polymer powder feedstock is different from said second thermoplastic polymer powder feedstock.

2. The method of claim 1 wherein, in the step of directing the tunable thermoplastic polymer sealant material from the high-velocity cold sprayer to the substrate surface, the method further comprising;
    directing movement of the high-velocity cold sprayer, said movement directed by a robot, said robot in communication with the high-velocity cold sprayer, said robotic further in communication with a controller.

3. The method of claim 1, substantially concurrently with delivering the first thermoplastic polymer powder feedstock and the second thermoplastic polymer powder feedstock to the high-velocity cold sprayer further comprising;

delivering a conductive powder feedstock to the high-velocity cold sprayer, said conductive powder feedstock at least one of: titanium, nickel alloy, copper, carbon black, graphene powder, and carbon nanotubes.

4. The method of claim 3, further comprising:

combining the thermoplastic polymer powder feedstock and the conductive powder feedstock at the high-velocity cold sprayer.

5. The method of claim 4, further comprising:

forming a tunable conductive thermoplastic sealant material said tunable conductive thermoplastic sealant material comprising a density ranging from about 1.0 to about 1.8 g/cc; and maintaining the tunable conductive thermoplastic sealant material at a temperature less than the melting point of the tunable conductive thermoplastic sealant material.

6. The method of claim 5, further comprising:

depositing the tunable conductive thermoplastic sealant material to the substrate surface.

7. The method of claim 6 wherein the conductive thermoplastic polymer sealant material has a resistivity value ranging from about $1 \times 10^5$ to about $1 \times 10^8$ ohm-m.

8. The method of claim 6, further comprising:

forming a tunable conductive thermoplastic polymer seal.

9. The method of claim 8, wherein the tunable conductive thermoplastic polymer seal has a Young's modulus ranging from about 1 MPa to about 4 GPa.

10. The method of claim 8, wherein the tunable conductive thermoplastic polymer seal comprises at least one of: a fillet seal and an edge seal.

11. The method of claim 5, wherein the tunable conductive thermoplastic polymer sealant material comprises a coloring agent.

12. The method of claim 5, wherein said tunable conductive thermoplastic sealant material mixture comprises a conductive material in an amount ranging from about 1% to about 9% by volume of the conductive thermoplastic sealant material.

13. The method of claim 3, wherein, in the step of directing the thermoplastic polymer powder feedstock from the high-velocity cold sprayer to a substrate surface, the method further comprising;

directing movement of the high-velocity cold sprayer, said movement directed by a robot in communication with the high-velocity cold sprayer, said robot further in communication with a controller.

14. The method of claim 3, wherein the tunable conductive powder feedstock is delivered to the high-velocity cold sprayer in an amount ranging from about 1% to about 9% by volume of the amount of the at least one thermoplastic polymer powder feedstock.

15. The method of claim 3, wherein said conductive powder feedstock comprises an average particle size ranging from about 5 μm to about 80 μm.

16. The method of claim 1, further comprising:

combining the first thermoplastic polymer powder feedstock and the second thermoplastic polymer powder feedstock with a conductive powder to form a tunable conductive thermoplastic powder feedstock mixture.

17. The method of claim 16, wherein the tunable conductive thermoplastic powder feedstock mixture comprises conductive powder in an amount ranging from about 1% to about 9% by volume of the conductive thermoplastic polymer powder feedstock.

18. The method of claim 1, further comprising;

maintaining the temperature of the tunable thermoplastic sealant material at a temperature that is below the melting point of the thermoplastic sealant material.

19. The method of claim 1, wherein the tunable thermoplastic polymer seal has a Young's modulus ranging from about 1 MPa to about 4 GPa.

20. The method of claim 1, wherein the tunable thermoplastic polymer seal comprises at least one of: a fillet seal and an edge seal.

21. The method of claim 1, wherein the tunable thermoplastic polymer powder feedstock comprises a coloring agent.

* * * * *